(12) United States Patent
Mootha et al.

(10) Patent No.: US 12,544,403 B2
(45) Date of Patent: Feb. 10, 2026

(54) METHODS TO TREAT MITOCHONDRIAL-ASSOCIATED DYSFUNCTIONS OR DISEASES

(71) Applicant: The General Hospital Corporation, Boston, MA (US)

(72) Inventors: Vamsi K. Mootha, Boston, MA (US); Warren M. Zapol, Cambridge, MA (US); Isha Jain, Cambridge, MA (US); Luca Zazzeron, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 858 days.

(21) Appl. No.: 17/421,909

(22) PCT Filed: Jan. 10, 2020

(86) PCT No.: PCT/US2020/013127
§ 371 (c)(1),
(2) Date: Jul. 9, 2021

(87) PCT Pub. No.: WO2020/146758
PCT Pub. Date: Jul. 16, 2020

(65) Prior Publication Data
US 2022/0096541 A1   Mar. 31, 2022

Related U.S. Application Data

(60) Provisional application No. 62/790,681, filed on Jan. 10, 2019.

(51) Int. Cl.
| | | |
|---|---|---|
| *A61K 45/06* | (2006.01) | |
| *A61K 35/12* | (2015.01) | |
| *A61K 48/00* | (2006.01) | |
| *A61P 25/00* | (2006.01) | |
| *C12N 15/113* | (2010.01) | |

(52) U.S. Cl.
CPC ........... *A61K 35/12* (2013.01); *A61K 45/06* (2013.01); *A61K 48/0091* (2013.01); *A61P 25/00* (2018.01); *C12N 15/113* (2013.01); *A61K 2035/124* (2013.01)

(58) Field of Classification Search
CPC ..... A61K 45/06; A61K 2035/124; A61P 3/10; A61P 25/28; C07K 14/4702; C07K 14/805
See application file for complete search history.

(56) References Cited

U.S. PATENT DOCUMENTS

| | | |
|---|---|---|
| 4,522,811 A | 6/1985 | Eppstein et al. |
| 5,101,819 A | 4/1992 | Lane |
| 5,850,833 A | 12/1998 | Kotliar |
| 6,168,587 B1 | 1/2001 | Bellhouse et al. |
| 6,194,389 B1 | 2/2001 | Johnston et al. |
| 6,468,798 B1 | 10/2002 | Debs et al. |
| 6,471,996 B1 | 10/2002 | Sokoll et al. |
| 6,472,375 B1 | 10/2002 | Hoon et al. |
| 7,399,785 B2 | 7/2008 | Kirkpatrick et al. |
| 7,841,929 B2 | 11/2010 | Spiegel et al. |
| 8,389,572 B2 | 3/2013 | Motterlini et al. |
| 9,796,697 B2 | 10/2017 | Wehn et al. |
| 10,155,726 B2 | 12/2018 | Wehn et al. |
| 10,842,812 B2 | 11/2020 | Mootha et al. |
| 2003/0176349 A1 | 9/2003 | Semenza et al. |
| 2004/0134493 A1 | 7/2004 | McCombs et al. |
| 2005/0043595 A1 | 2/2005 | Miller |
| 2005/0247311 A1 | 11/2005 | Vacciano et al. |
| 2006/0011199 A1 | 1/2006 | Rashad et al. |
| 2006/0185669 A1 | 8/2006 | Bassovitch |
| 2007/0077200 A1 | 4/2007 | Baker |
| 2007/0221225 A1 | 9/2007 | Kutt et al. |
| 2009/0025726 A1 | 1/2009 | Maybaum |
| 2011/0240019 A1 | 10/2011 | Fine et al. |
| 2012/0282353 A1 | 11/2012 | Roth et al. |
| 2013/0123341 A1 | 5/2013 | Parker, Jr. |
| 2013/0288328 A1 | 10/2013 | Dunning et al. |
| 2014/0275901 A1 | 9/2014 | Flanagan et al. |
| 2014/0294842 A1 | 10/2014 | Maxwell et al. |
| 2016/0038710 A1 | 2/2016 | Zapol et al. |

(Continued)

FOREIGN PATENT DOCUMENTS

| | | |
|---|---|---|
| WO | WO 1997/003631 | 2/1997 |
| WO | WO 2002/079167 | 10/2002 |

(Continued)

OTHER PUBLICATIONS

Toledo, Rodrigo Almeida. "New HIF2α inhibitors: potential implications as therapeutics for advanced pheochromocytomas and paragangliomas." Endocrine-related cancer 24.9 (2017): C9-C19. (Year: 2017).*

(Continued)

*Primary Examiner* — Maria G Leavitt
*Assistant Examiner* — Michael Angelo Riga
(74) *Attorney, Agent, or Firm* — Fish & Richardson P.C.

(57) ABSTRACT

Methods for the treatment of disorders associated with mitochondrial dysfunction, including rare, inborn errors of metabolism caused by genetic mutations; neurodegenerative disease; diabetes; and aging and age-associated decline. Generally, the methods include administering a therapeutically effective amount of one or more treatments that (i) induce hemoglobin "left-shifting" and/or (ii) induce anemia, as described herein, to a subject who is in need of, or who has been determined to be in need of, such treatment.

6 Claims, 24 Drawing Sheets

(56) References Cited

U.S. PATENT DOCUMENTS

| | | | |
|---|---|---|---|
| 2016/0095994 A1 | 4/2016 | Currin et al. | |
| 2016/0124002 A1* | 5/2016 | Park | C07C 59/76 |
| | | | 435/7.1 |
| 2016/0158481 A1 | 6/2016 | Klein et al. | |
| 2016/0368893 A1 | 12/2016 | Dixon et al. | |
| 2017/0152513 A1* | 6/2017 | Orkin | A61K 35/28 |
| 2019/0015377 A1 | 1/2019 | Dixon et al. | |
| 2021/0093660 A1 | 4/2021 | Mootha et al. | |

FOREIGN PATENT DOCUMENTS

| | | | |
|---|---|---|---|
| WO | WO 2006/016143 | 2/2006 | |
| WO | WO 2007/086766 | 8/2007 | |
| WO | WO 2008/003953 | 1/2008 | |
| WO | WO 2009/143268 | 11/2009 | |
| WO | WO 2010/063471 | 6/2010 | |
| WO | WO 2011/051357 | 5/2011 | |
| WO | WO 2014/143842 A1 | 9/2014 | |
| WO | WO 2017/027810 | 2/2017 | |
| WO | WO 2017/165167 | 9/2017 | |
| WO | WO-2017165167 A1 * | 9/2017 | ........... A01K 7/0276 |
| WO | WO 2017/218960 | 12/2017 | |
| WO | WO-2017218960 A1 * | 12/2017 | ........... C07D 401/04 |
| WO | WO 2018/160772 | 9/2018 | |
| WO | WO 2020/072377 A1 | 4/2020 | |

OTHER PUBLICATIONS

Oksenberg, Donna, et al. "GBT 440 increases haemoglobin oxygen affinity, reduces sickling and prolongs RBC half-life in a murine model of sickle cell disease." British journal of haematology 175.1 (2016): 141-153. (Year: 2016).*

Jain, Isha H., et al. "Hypoxia as a therapy for mitochondrial disease." Science 352.6281 (2016): 54-61. (Year: 2016).*

Leow, Melvin Khee-Shing. "Configuration of the hemoglobin oxygen dissociation curve demystified: a basic mathematical proof for medical and biological sciences undergraduates." Advances in physiology education 31.2 (2007): 198-201. (Year: 2007).*

Brand, Martin D., and David G. Nicholls. "Assessing mitochondrial dysfunction in cells." Biochemical Journal 435.2 (2011): 297-312. (Year: 2011).*

Abdulmalik et al., "5-hydroxymethyl-2-furfural modifies intracellular sickle haemoglobin and inhibits sickling of red blood cells," Brit J Haematol., Feb. 2005, 128(4):552-561.

Advanced Life Support Group, "Oxygen Therapy Guidelines," In Safe Transfer and Retrieval: The Practical Approach, Second Edition. Blackwell Publishing Ltd. Jan. 28, 2008; pp. 197-200; DOI: 10.1002/9780470757437.

Antoniani et al., "Induction of fetal hemoglobin synthesis by CRISPR/Cas9-mediated editing of the human β-globin locus," Blood, Apr. 2018, 131(17):1960-1973.

Aragonés et al., "Deficiency or inhibition of oxygen sensor Phd1 induces hypoxia tolerance by reprogramming basal metabolism," Nature Genetics, 2008, 40(2):170-180.

Arya et al., "Tucaresol increases oxygen affinity and reduces haemolysis in subjects with sickle cell anaemia," Br J Haematol., 1996, 93(4):817-821.

Ast et al., "Hypoxia Rescues Frataxin Loss by Restoring Iron Sulfur Cluster Biogenesis," Cell, May 2019, 177(6):1507-1521, 32 pages.

Beddell et al., "Substituted benzaldehydes designed to increase the oxygen affinity of human haemoglobin and inhibit the sickling of sickle erythrocytes," Br J Pharmacol., 1984, 82(2):397-407.

Bernier et al., "Diagnostic criteria for respiratory chain disorders in adults and children," Neurology, 2002, 59(9):1406-11.

Bishop et al., "Abnormal sympathoadrenal development and systemic hypotension in PHD3-/mice," Molecular and Cellular Biology, 2008, 28:3386-3400.

Blumenthal, "Carbon monoxide poisoning," Journal of the Royal Society of Medicine, 2001, 94:270-272.

Brendel et al., "Lineage-specific BCL11A knockdown circumvents toxicities and reverses sickle phenotype," J Clin Invest., 2016, 126(10):3868-3878.

Buckley et al., "Targeting the von Hippel-Lindau E3 Ubiquitin Ligase Using Small Molecules To Disrupt the VHUHIF-1a Interaction," Journal of the American Chemical Society, Feb. 2012, 134:4465-4468.

Creighton-Gutteridge et al., "Cell Type-Specific, Topoisomerase II-Dependent Inhibition of Hypoxia-Inducible Factor-1α Protein Accumulation by NSC 644221," Clin. Cancer Res., 2007, 13(3):1010-1018.

Dufu and Oksenberg, "GBT440 reverses sickling of sickled red blood cells under hypoxic conditions in vitro," Hematol. Rep., 2018, 10(2):7419, 5 pages.

EP Extended European Search Report in EP Application No. EP16835981.8, dated Aug. 22, 2019, 17 pages.

EP Office Action in European Appln. No. 16835981.8, dated Apr. 19, 2021, 8 pages.

EP Partial Supplementary European Search report in EP Application No. EP16835981.8, dated May 20, 2019, 20 pages.

Faizan et al., "CO-Releasing Materials: An Emphasis on Therapeutic Implications, as Release and Subsequent Cytotoxicity Are the Part of Therapy," Materials (Basel), May 2019, 12(10):1643, 41 pages.

Ferrari et al., "Hypoxia treatment reverses neurodegenerative disease in a mouse model of Leigh syndrome," Proceedings of the National Academy of Sciences, 2017, 114(21):E4241-E4250, 10 pages.

Girdwood, "Drug-Induced Anaemias," Drugs, 1976, 11(5):394-404.

Gorman et al., "Prevalence of nuclear and mitochondrial DNA mutations related to adult mitochondrial disease," Ann. Neurol., 2015, 77:753-759.

Guda et al., "miRNA-embedded shRNAs for Lineage-specific BCL11A Knockdown and Hemoglobin F Induction," Mol Ther., Sep. 2015, 23(9):1465-74.

Gullotta et al., "Carbon Monoxide: An Unusual Drug," IUBMB Life, May 2012, 64(5):378-86.

Haas et al., "Mitochondrial Disease: A Practical Approach for Primary Care Physicians," Pediatrics, 2007, 120: 1326-33, 10 pages.

Hamajima et al., "Intranasal Administration of HIV-DNA Vaccine Formulated with a Polymer, Carboxymethylcellulose, Augments Mucosal Antibody Production and Cell-Mediated Immune Response," Clin. Immunol. Immunopathol., Aug. 1998, 88(2):205-10.

Hebbel and Hedlund, "Sickle hemoglobin oxygen affinity-shifting strategies have unequal cerebrovascular risks," Am J Hematol., Mar. 2018, 93:321-325.

Hess, "Inhaled Carbon Monoxide: From Toxin to Therapy," Respiratory Care, Oct. 2017, 62(10):1333-1342.

Hickey et al., "von Rippel-Lindau mutation in mice recapitulates Chuvash polycythemia via hypoxia-inducible factor-2a signaling and splenic erythropoiesis," The Journal of Clinical Investigation, 2007, 117:3879-3889.

Hikmat et al., "The presence of anaemia negatively influences survival in patients with POLG disease," J Inherit Metab Dis., 2017, 40(6):861-866, 6 pages.

Hirst et al., "The production of reactive oxygen species by complex I," Biochem Soc Trans., 2008, 36:976-980.

Hoban et al., "Genetic treatment of a molecular disorder: gene therapy approaches to sickle cell disease," Blood, Feb. 2016, 127(7): 839-848.

International Preliminary Report on Patentability in International Application No. PCT/US2016/046791, dated Feb. 13, 2018, 16 pages.

International Preliminary Report on Patentability in International Application No. PCT/US2020/013127, dated Jul. 22, 2021, 7 pages.

International Search Report and Written Opinion in International Appln. No. PCT/US2020/013127, dated Apr. 8, 2020, 8 pages.

International Search Report and Written Opinion mailed Feb. 1, 2017 in International Application No. PCT/US2016/046791, 25 pgs.

Ivan et al., "HIFα targeted for VHL-mediated Destruction by Proline Hydroxylation: Implications for $O_2$ Sensing," Science, 2001, 292(5516):464-468.

(56) References Cited

OTHER PUBLICATIONS

Jain et al, "Hypobaric Hypoxia Imbalances Mitochondrial Dynamics in Rat Brain Hippocampus," Neurology Research International, 2015, pp. 1-12.
Jain et al., "Hypoxia as a therapy for mitochondrial disease," Science, 2016, 352(6281):54-61, 14 pages.
Jain et al., "Leigh Syndrome Mouse Model Can Be Rescued by Interventions that Normalize Brain Hyperoxia, but Not HIF Activation," Cell Metabolism, Oct. 2019, 30: 13 pages.
Jeon et al., "Acute brain lesions on magnetic resonance imaging and delayed neurological sequelae in carbon monoxide poisoning," JAMA Neurology, 2018, 75(4):436-443, 8 pages.
Jun et al., "Wondonin, a novel compound, inhibits hypoxia-induced angiogenesis through hypoxia-inducible factor 1 alpha," FEBS Lett., Oct. 2007, 581(25):4977-4982.
Kayser et al., "Region-specific defects of respiratory capacities in the Ndufs4 (KO) mouse brain," PloS One, 2016, 11(1):e0148219, 18 pages.
Kong et al., "Echinomycin, a Small-Molecule Inhibitor of Hypoxia-Inducible Factor-1 DNA-Binding Activity," Cancer Res., Oct. 2005, 65:9047-9055.
Kussmaul et al., "The mechanism of superoxide production by NADH: ubiquinone oxidoreductase (complex I) from bovine heart mitochondria," Proceedings of the National Academy of Sciences, 2006, 103(20):7607-7612.
Lake et al., "Leigh syndrome: neuropathology and pathogenesis," J. Neuropathol. Exp. Neurol., 2015, 74(6):482-492.
Li et al., "Small-Molecule Modulators of the Hypoxia-Inducible Factor Pathway: Development and Therapeutic Applications," Journal of Medicinal Chemistry, 2019, 62(12):5725-5749.
Li et al., "Therapeutic Potential of a prolyl hydroxylase inhibitor FG-4592 for Parkinson's Diseases in vitro and in vivo: Regulation of Redox Biology and Mitochondrial Function," Front Aging Neurosci., 2018, 10:121, 16 pages.
Liu et al., "RACK1 Competes with HSP90 for Binding to HIF-1α and Is Required for O2-Independent and HSP90 Inhibitor-Induced Degradation of HIF-1α," Mol. Cell, Jan. 2007, 25(2):207-217.
Lohar et al., "Design and synthesis of novel furoquinoline based inhibitors of multiple targets in the PI3K/Akt-mTOR pathway," Bioorg. Med. Chem. Lett., Jun. 2008, 18(12):3603-3606.
Lopez et al., "Iron deficiency anaemia," The Lancet, 2016, 387(10021):907-916, 10 pages.
Majmundar et al., "Hypoxia-inducible factors and the response to hypoxic stress," Molecular Cell, 2010, 40(2):294-309.
Martinez-Saez et al., "Targeting HIF-2 α in clear cell renal cell carcinoma: A promising therapeutic strategy," Crit Rev Oncol Hematol., 2017, 111:117-123.
Mazzone et al., "Heterozygous deficiency of PHD2 restores tumor oxygenation and inhibits metastasis via endothelial normalization," Cell, 2009, 136(5):839-851.
Mckeown, "Defining normoxia, physoxia and hypoxia in tumours-implications for treatment response," The British Journal of Radiology, Mar. 2014, 87(1035), 12 pages.
Mclaughlin et al., "Abstract LB-385: Pre-clinical development of the novel, broad spectrum, anti-cancer agent EL102," American Association for Cancer Research, 2011, 71(8_Supplement):LB-385, 3 pages (Abstract Only).
Merrett et al., "Characterization of the binding of the anti-sickling compound, BW12C, to haemoglobin," Biochem J., Oct. 1986, 239(2):387-392.
Michiels, "Physiological and Pathological Responses to Hypoxia," American Journal of Pathology, Jun. 2004, 164(6):1875-1882.
Morava et al., "Mitochondrial disease criteria: diagnostic applications in children," Neurology, 67(10): 1823-6, 2006.
Narita et al., "Identification of a Novel Small Molecule HIF-1α Translation Inhibitor," Clin. Cancer Res., Sep. 2009, 15(19):6128-6136.
O'Donnell et al., "The magnetic resonance imaging appearances of the brain in acute carbon monoxide poisoning," Clinical Radiology, 2000, 55:273-280.
Oksenberg et al., "GBT 440 increases haemoglobin oxygen affinity, reduces sickling and prolongs RBC half-life in a murine model of sickle cell disease," British Journal of Haematology, 2016, 175:141-153.
Parikh et al., "A Modern Approach to the Treatment of Mitochondrial Disease," Curr Treat Options Neurol, 2009, 11(6):414-30.
Parikh et al., "Diagnosis and management of mitochondrial disease: a consensus statement from the Mitochondrial Medicine Society," Genetics in Medicine, 2015, 17(9):689-701.
Pili and Donehower, "Is HIF-1 alpha a valid therapeutic target?," J. Natl. Cancer Inst., Apr. 2003, 95(7):498-499.
Quaegebeur et al., "Deletion or inhibition of the oxygen sensor PHD 1 protects against ischemic stroke via reprogramming of neuronal metabolism," Cell Metabolism, 2016, 23(2):280-291.
Rich et al., "Chemiosmotic coupling: the cost of living," Nature, 2003, 421:583.
Roberts et al., "Inhaled Nitric Oxide and Persistent Pulmonary Hypertension of the Newborn," The New England Journal of Medicine, Feb. 1997, 336(9):605-610.
Romão et al., "Developing drug molecules for therapy with carbon monoxide," Chem Soc Rev., May 2012, 41(9):3571-3583.
Rosas et al., "A phase II clinical trial of low-dose inhaled carbon monoxide in idiopathic pulmonary fibrosis," Chest, 2018, 153:94-104.
Rossaint et al., "Inhaled Nitric Oxide for the Adult Respiratory Distress Syndrome," The New England Journal of Medicine, Feb. 1993, 328(6):399-405.
Safo and Kato, "Therapeutic Strategies to Alter the Oxygen Affinity of Sickle Hemoglobin," Hematol Oncol Clin North Am., Apr. 2014, 28(2):217-231.
Schatzschneider, "Novel lead structures and activation mechanisms for CO-releasing molecules (CORMs)," Br J Pharmacol., Mar. 2015, 172(6):1638-1650.
Stepanova et al., "The dependence of brain mitochondria reactive oxygen species production on oxygen level is linear, except when inhibited by antimycin," A Journal of Neurochemistry, 2019, 148(6):731-745, 15 pages.
Taghavi et al., "Inhibition of γ/β Globin Gene Switching in CD 34+ Derived Erythroid Cells by BCL11A RNA Silencing," Indian J Hematol Blood Transfus., Oct. 2019, 35(4):758-764.
Taivassalo et al., "Venous oxygen levels during aerobic forearm exercise: an index of impaired oxidative metabolism in mitochondrial myopathy," Annals of Neurology, 2002, 51(1):38-44.
Toledo, "New HIF2α inhibitors: potential implications as therapeutics for advanced pheochromocytomas and paragangliomas," Endocrine-Related Cancer, Sep. 2017, 24(9):C9-C19.
Vafai and Mootha, "Mitochondrial disorders as windows into an ancient organelle," Nature, 2012, 491:374-83.
Wang et al., "Hypoxia-inducible factor 1 is a basic-helix-loop-helix-PAS heterodimer regulated by cellular 02 tension," Proceedings of the National Academy of Sciences, 1995, 92(12):5510-5514.
Wehn et al., "Design and Activity of Specific Hypoxia-Inducible Factor-2α(HIF-2α) Inhibitors for the Treatment of Clear Cell Renal Cell Carcinoma: Discovery of Clinical Candidate ( S)-3-((2,2-Difluoro-1-hydroxy-7-(methylsulfony1)-2,3-dihydro-1 H-inden-4-y1)oxy)-5-fluorobenzonitrile (PT2385)," J. Med. Chem., Nov. 2018, 61(21):9691-9721.
Wilber et al., "Therapeutic levels of fetal hemoglobin in erythroid progeny of β-thalassemic CD34+ cells after lentiviral vector-mediated gene transfer," Blood, 2011, 117(10):2817-26.
Xu et al., "3-[(1 S,2 S,3 R)-2,3-Difluoro-1-hydroxy-7-methylsulfonylindan-4-yl]oxy-5-fluorobenzonitrile (PT2977), a Hypoxia-Inducible Factor 2α (HIF-2α) Inhibitor for the Treatment of Clear Cell Renal Cell Carcinoma," Journal of Medicinal Chemistry, Aug. 2019, 62(15):6876-6893.
Yewalkar et al., "Development of novel inhibitors targeting HIF-1α towards anticancer drug discovery," Bioorg. Med. Chem. Lett., Sep. 2010, 20(22):6426-6429.
Young et al., "Response Time of Pulse Oximeters Assessed Using Acute Decompression," Anesthesia Analogs 74:189-95 (Feb. 1992).
Zaugg et al., "Schiff base adducts of hemoglobin. Modifications that inhibit erythrocyte sickling," J. Biol. Chem., Dec. 1977, 252(23):8542-8548.

(56) References Cited

OTHER PUBLICATIONS

Zeviani et al., "Mitochondrial disorders," Blood, Oct. 2004, 127(10):2153-2172.
Zhang et al., "Digoxin and other cardiac glycosides inhibit HIF-1α synthesis and block tumor growth," Proc. Natl. Acad. Sci. USA, Dec. 2008, 105(50):19579-19586.
Zoran, "Hypoxia or in Situ Normoxia: The Stem Cell Paradigm," Journal of Cellular Physiology, May 2009, 219(2):271-275.
Hooley, "Decoding the Oxyhemoglobin Dissociation Curve," American Nurse Today, Jan. 2015, 10(1):18-23.
Blume et al., "HypoxyStat, a small-molecule form of hypoxia therapy that increases oxygen-hemoglobin affinity," Cell, Mar. 2025, 188(6):1580-1588.e11.
Choi et al., "Loss of mitochondrial complex I activity potentiates dopamine neuron death induced by microtubule dysfunction in a Parkinson's disease model," Journal of Cell Biology, Mar. 2011, 192(5):873-82.
Gonchar et al., "Moderate hypoxia/hyperoxia attenuates acute hypoxia-induced oxidative damage and improves antioxidant defense in lung mitochondria," Acta Physiologica Hungarica, Dec. 2012, 99(4):436-46.
Grillo et al., "The NDUFS4 Knockout Mouse: A Dual Threat Model of Childhood Mitochondrial Disease and Normative Aging," Methods in Molecular Biology, Jun. 2021, 2277:143-155.
Johnson et al., "mTOR Inhibition Alleviates Mitochondrial Disease in a Mouse Model of Leigh Syndrome," HHS Public Access Author Manuscript, doi: 10.1126/science.1244360, published online Jun. 20, 2014; published in final edited form as: Science, Dec. 2013, 342(6165):1524-8, 10 pages.
Johnson et al., "mTOR inhibitors may benefit kidney transplant recipients with mitochondrial diseases," HHS Public Access Author Manuscript, doi: 10.1016/j.kint.2018.08.038, published online Feb. 1, 2020; published in final edited form as: Kidney International, Feb. 2019, 95(2):455-466, 22 pages.
Kruse et al., "Mice with mitochondrial complex I deficiency develop a fatal encephalomyopathy," HHS Public Access Author Manuscript, doi: 10.1016/j.cmet.2008.02.004, published online Dec. 3, 2008; published in final edited form as: Cell Metabolism, Apr. 2008, 7(4):312-320, 18 pages.
Nakao et al., "Therapeutic antioxidant medical gas," J. Clin. Biochem. Nutr., Jan. 2009, 44(1):1-13.
Partial European Search Report in European Appln. No. 24220669.6, mailed on Apr. 17, 2025, 19 pages.
Rogers et al., "Hypoxia extends lifespan and neurological function in a mouse model of aging," PLoS Biology, May 2023, 21(5):e3002117, 14 pages.
Sage-Schwaede et al., "Exploring mTOR inhibition as treatment for mitochondrial disease," Annals of Clinical and Translational Neurology, Sep. 2019, 6(9):1877-1881.
Siegmund et al., "Low-dose rapamycin extends lifespan in a mouse model of mtDNA depletion syndrome," Human Molecular Genetics, Dec. 2017, 26(23):4588-4605.
Wang et al., "Therapeutic hypoxia for mitochondrial disease via enhancement of hemoglobin affinity and inhibition of HIF-2α," The Journal of Clinical Investigation, Dec. 2024, 134(23):e185569, 2 pages.

\* cited by examiner

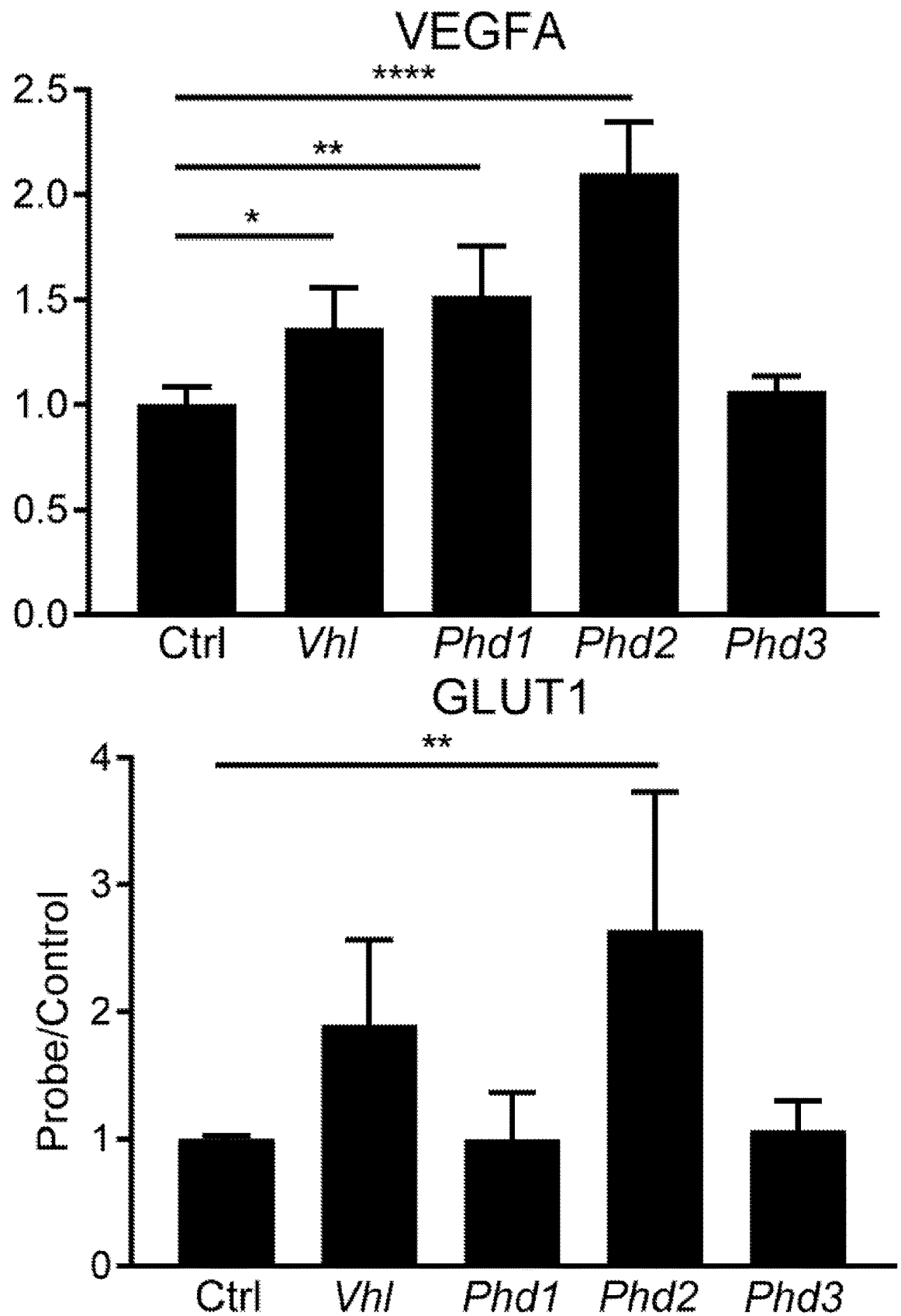
FIG. 1C, continued

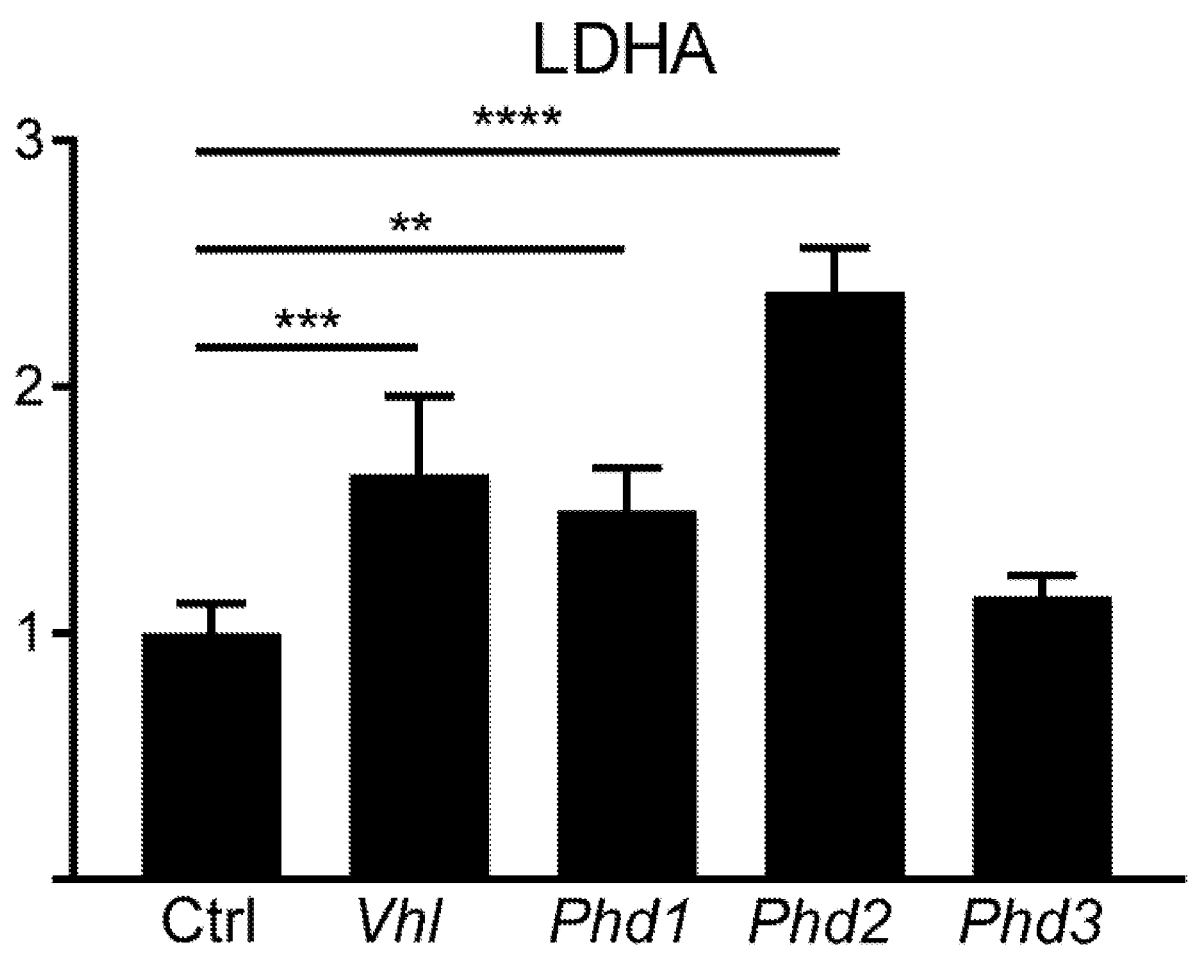
FIG. 1C, continued late-stage disease (~55 d)      2-3 wks of ~600 ppm CO

METHODS TO TREAT MITOCHONDRIAL-ASSOCIATED DYSFUNCTIONS OR DISEASES

CLAIM OF PRIORITY

This application is a § 371 National Stage Application of PCT/US2020/013127, filed 10 Jan. 2020, which claims the benefit of U.S. Provisional Application Ser. No. 62/790,681, filed on 10 Jan. 2019. The entire contents of the foregoing are incorporated herein by reference.

TECHNICAL FIELD

Described herein are methods for the treatment of disorders associated with mitochondrial dysfunction, including rare, inborn errors of metabolism caused by genetic mutations; neurodegenerative disease; diabetes; and aging and age-associated decline. Generally, the methods include administering a therapeutically effective amount of one or more treatments that (i) induce hemoglobin "left-shifting" and/or (ii) induce anemia, as described herein, to a subject who is in need of, or who has been determined to be in need of, such treatment.

BACKGROUND

There is growing evidence that mitochondrial dysfunction is associated with a broad range of human diseases. Virtually all common, age-associated disorders, including type 2 diabetes, neurodegeneration, and sarcopenia, are accompanied with a quantitative decline in the activity of the mitochondrial respiratory chain (Vafai et al., Nature, 491:374-83 (2012); Parikh et al., Curr Treat Options Neurol. 11:414-30 (2009). Monogenic disorders of the mitochondrial respiratory chain represent the largest class of inborn errors of metabolism. To date, lesions in over 150 genes, encoded by the nuclear or mitochondrial (mtDNA) genome, have been identified as disease-causing. Mutations in these genes lead to a biochemical deficiency of one or more of the respiratory chain complexes, leading to either tissue-specific or multisystemic disease. Management of these disorders remains incredibly challenging, owing to the remarkable genetic heterogeneity and pleiotropy.

SUMMARY

As previously reported, low inspired oxygen can be protective and even reverse disease in cells and in animal models with mitochondrial dysfunction (WO2017027810). As shown herein, agents that reduce oxygen delivery, including small molecule hemoglobin "left-shifters," gaseous agents such as carbon monoxide that increase the affinity of hemoglobin for oxygen, and phlebotomizing, also similarly have therapeutic benefit for disorders associated with mitochondrial dysfunction. Fetal hemoglobin is also left shifted, so agents that induce fetal hemoglobin may also have the same net effect. Such approaches represent alternative means of reducing oxygen delivery to tissues and hence can also induce the protective effects we have previously reported with hypoxia. Present data in which sublethal doses of carbon monoxide were used to induce a hemoglobin left shift, and present data in which mice were phlebotomized, in a mouse model of mitochondrial disease showed that such methods alleviate disease.

Thus, provided herein are methods for the treatment of a disorder associated with mitochondrial dysfunction in a subject. The methods include administering to the subject a therapeutically effective amount of one or more treatments that (i) induce hemoglobin (Hb) left-shifting and/or (ii) induce anemia, to a subject who is in need of, or who has been determined to be in need of, such treatment. Also provided herein are treatments that (i) induce hemoglobin (Hb) left-shifting and/or (ii) induce anemia for the treatment of a disorder associated with mitochondrial dysfunction in a subject.

In some embodiments, the disorder associated with mitochondrial dysfunction is a disease caused by a genetic mutation; a neurodegenerative disease; diabetes; or aging and age-associated decline. In some embodiments, the disorder is Leigh syndrome or Friedrich's ataxia.

In some embodiments, the treatment that induces Hb left-shifting comprises administration of a small molecule Allosteric Effector of Hb (AEH) that left shifts Hb, inhaled carbon monoxide (CO), one or more Carbon monoxide-releasing molecules (CORMs), or gene therapy to promote expression of fetal hemoglobin (HbF).

In some embodiments, the AEH is selected from the group consisting of hydroxyurea, VOXELOTOR (GBT440), substituted benzaldehydes; Tucaresol; aliphatic isothiocyanates; and aromatic aldehydes.

In some embodiments, the gene therapy comprises administration of autologous hematopoietic stem cells treated ex vivo using a CRISPR RNA-guided nuclease or base editor or with an inhibitory nucleic acid that targets and reduces expression of BCL11A.

In some embodiments, the treatment that induces anemia comprises bloodletting or administration of an inhibitor of hypoxia inducible factor (HIF)-2alpha (HIF-2a).

In some embodiments, the inhibitor of HIF-2a is PT2399, PT2977, PT2385, or PT2567, or compounds 163, 226, or 231 disclosed in US20190015377.

Also provided herein are methods to prevent or treat a mitochondrial-associated dysfunction or disease in a mammal, by presenting to said mammal an intervention that reduces the delivery (or uptake) of oxygen in the tissues of said mammal.

In some embodiments, the intervention is a reduction in the fraction of inspired oxygen gas. In some embodiments, the fraction of inspired oxygen gas is <17%.

In some embodiments, the intervention is one which increases the affinity of oxygen for hemoglobin or, otherwise, left-shifts the oxygen-hemoglobin dissociation curve (a hemoglobin left shifter). In some embodiments, the hemoglobin left shifter includes, but is not limited to, (a) a small molecule or combination of small molecules; (b) respiratory exposure to low dose or concentration of carbon monoxide gas in air; or (c) creating a condition of anemia. In some embodiments, the small molecule is GBT440, hydroxyurea, or some combination thereof.

In some embodiments, the concentration of carbon monoxide gas in air is approximately 600 ppm.

In some embodiments, the anemic condition is created by removing the blood from said mammal in an amount sufficient to induce an iron deficiency in said mammal. In some embodiments, the anemic condition is created by removing the blood from said mammal in an amount sufficient to induce hypoxia in the tissues of said mammal.

In some embodiments, said intervention is chronic.

In some embodiments, said intervention is intermittent.

In some embodiments, the mitochondrial-associated dysfunction or disease comprises one or more mitochondrial genetic or acquired defects. In some embodiments, the one or more mitochondrial genetic or acquired defects occur, although not exclusive of, a protein or a protein complex, wherein the protein is selected from Complex I Complex II, Complex III, Complex IV, V, or ATP Synthase. In some embodiments, the mitochondrial-associated dysfunction or disease is characterized by (but not limited to) a point mutation in the mitochondrial DNA (mtDNA), deletion within the mtDNA, duplication within the mtDNA, or depletion of the mtDNA, mutation in a nuclear gene encoding a 'mitochondrial-localized protein, or a mutation or acquired defect in mitochondrial function. In some embodiments, the mitochondrial-associated dysfunction or disease is characterized by a biochemical deficiency of respiratory chain Complex I, II, III, IV, V or a combination thereof.

In some embodiments, the mitochondrial-associated dysfunction or disease is Kearns-Sayre syndrome (KSS), Leber's hereditary optic neuropathy, myoclonic epilepsy ragged red fiber syndrome, MELAS syndrome (mitochondria encephalopathy, lactic acidosis, stroke), SANDO syndrome (sensory ataxic neuropathy, dysarthria, ophthalmoparesis), maternally inherited Leigh syndrome, MNGIE syndrome (myopathy and external ophthalmoplegia, neuropathy, gastrointestinal encephalopathy), Leigh syndrome, MIDD syndrome (maternally inherited diabetes and deafness), Alpers-Huttenlocher syndrome, Sengers syndrome, MLASA (mitochondrial myopathy, lactic acidosis, sideroblastic anemia), chronic progressive external ophthalmoplegia, autosomal dominant progressive external ophthalmoplegia, NARP syndrome (neuropathy, ataxia, retinitis pigmentosa), GRACILE syndrome, DIDMOAD syndrome (diabetes insipidus, diabetese mellitis, optic atrophy, deafness), Pearson's syndrome, Parkinson's Disease, or Freidrich's ataxia.

In some embodiments, the mitochondrial-associated dysfunction or disease presents with one, or more, of: gray matter disease, white matter disease, seizures, migraines, ataxia, stroke, stroke-like episodes, deafness, blindness, optic neuropathy, peripheral neuropathy, retinopathy, external ophthalmoplegia, liver failure, kidney failure, pancreatic exocrine dysfunction, diabetes, intestinal pseudo-obstruction, anemia, skeletal muscle myopathy, cardiomyopathy, cardiac conduction defects, short stature, hypogonadism, immune dysfunction or metabolic acidosis.

In some embodiments, the mitochondrial-associated dysfunction or disease is a monogenic mitochondrial disorder or disease. In some embodiments, the monogenic gene mutation is in Ndufs4.

In some embodiments, the mitochondrial-associated dysfunction or disease affects aging or an aging-associated dysfunction/disease. In some embodiments, the aging-associated dysfunction/disease includes, but is not limited to, type 2 diabetes, insulin resistance, neurodegeneration, peripheral neuropathy, sarcopenia, muscle atrophy, deafness, atherosclerosis, cardiovascular disease, heart failure, chronic kidney disease, cancer, arthritis, cataracts, osteoporosis, or a combination thereof.

In some embodiments, the mitochondrial-associated dysfunction or disease is diagnosed by an algorithm selected from the group consisting of, but not limited to, Bernier criteria, Morava criteria, or the Consensus from the Mitochondrial Medicine Society.

In some embodiments, any gas is administered by, although not limited to, nasal prongs, a face mask, an enclosed tent or chamber, an intra-tracheal catheter, an endotracheal tube or a tracheostomy tube.

In some embodiments, the mammal is a human.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DETAILED DESCRIPTION

Figure 1A:
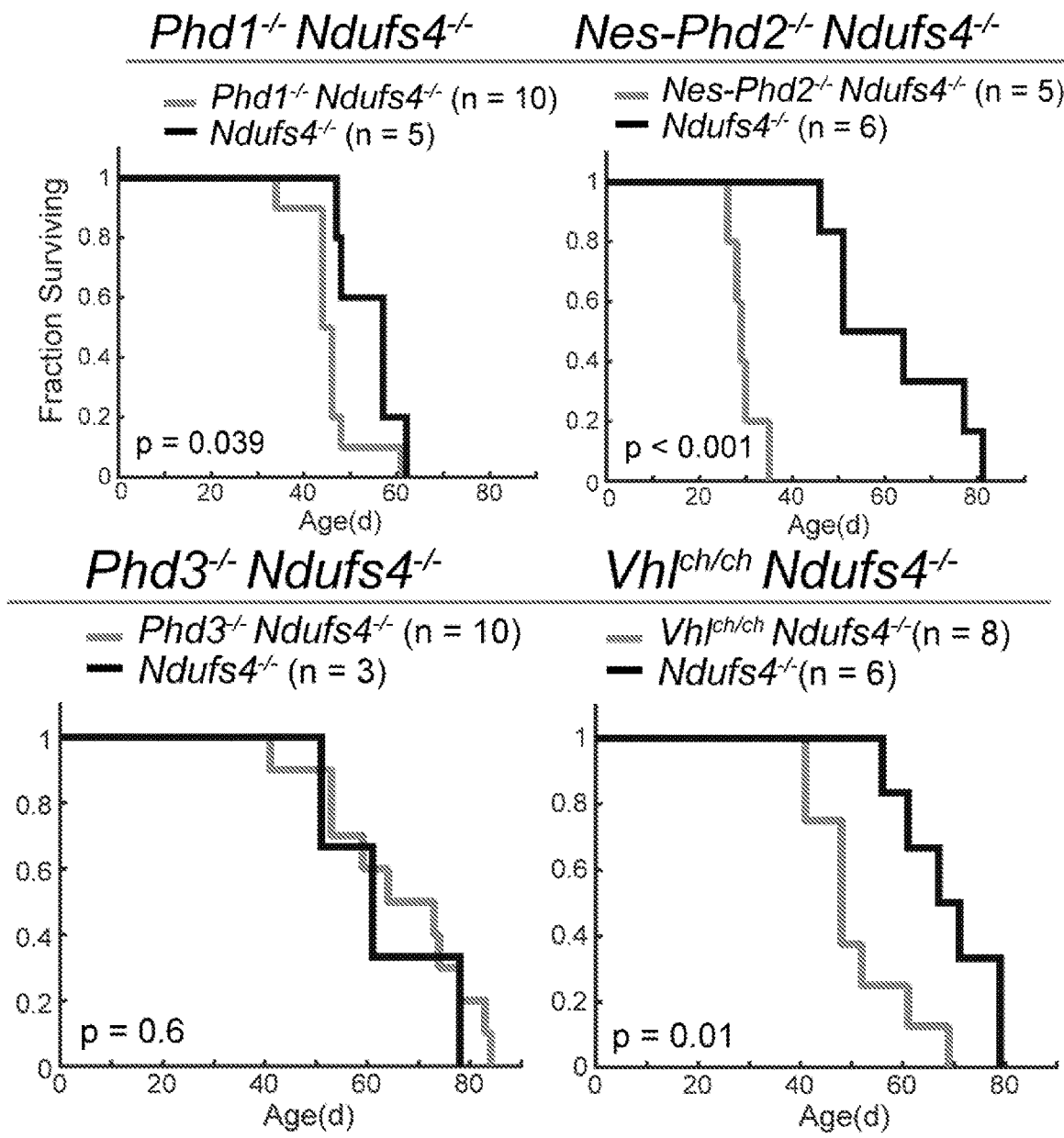
FIGS. 1A-D. Genetic activation of the hypoxia response is insufficient to prevent Leigh disease. (A) Kaplan-Meier curves for double KOs relative to single Ndufs4$^{-/-}$ KO mice. Log-rank p-values and sample size within insert. Single KOs are homozygous-null for Ndufs4 locus and WT or Het for other genetic locus of given cross. (B) MRI of vestibular nucleus (white arrow for Phd1, Phd2 and Phd3 crosses) of late-stage disease mice for each genotype. In Vh1 cross, white arrow corresponds to lateral lesions (dentate nucleus) and midline Lesion (central lobule, cerebellum) (C) qPCR for canonical HIF targets (n=4 per group). Mice are homozygous for given genotype and WT or Het for Ndufs4 genotype. (D) Hematocrit of control or Phd and Vh1 genetic models (WT or Het for Ndufs4). One-tailed unpaired t-test p-value shown for genetic crosses relative to control mice Sample size shown within insert. (*$p<0.05$, $p<0.01$, *$p<0.001$, ****$p<0.0001$ by one-way ANOVA, with Dunnett's test for multiple comparison)

Mitochondrial disorders are collectively the most common inborn errors of metabolism, with an estimated incidence of at least 1 in 4,300 births (Gorman et al., 2015). The most severe forms of disease occur due to mutations in structural components or assembly factors of the electron transport chain (ETC) and ATP synthase (CV). Of these disorders, Leigh syndrome is the most common pediatric manifestation of mitochondrial disease (Lake et al., 2015). Mutations in over 75 distinct genes can underlie this syndrome, with patients first showing symptoms at any stage from birth to childhood (Lake et al., 2015). Patients often develop seizures, failure-to-thrive, ataxia, developmental delay, and clinical regression, ultimately leading to death, typically within the first few years of life. Diagnosis of Leigh syndrome is based on the clinical presentation and radiographic findings of bilaterally-symmetric lesions on T2-weighted brain MRI. While significant advances have been made in defining their genetic basis, there are no generic treatments with proven efficacy in these patients. Recently, we demonstrated that chronic, continuous normobaric exposure to hypoxia (11% $FiO_2$) can prevent and even reverse the neurodegenerative brain disease in the Ndufs4 mouse model of Leigh syndrome, not only extending lifespan, but also normalizing body weight, body temperature, disease biomarkers, and improving behavioral performance (Ferrari et al., 2017; Jain et al., 2016).

It has been shown that chronic, continuous 11% $O_2$ breathing results in a striking rescue of brain disease in a mitochondrial disease, the Ndufs4 KO mouse model of Leigh syndrome (Jain et al., 2016; Ferrari et al., 2017). In addition, 11% hypoxic breathing also prevented neurological disease in a mouse model of Friedreich's ataxia (Ast et al., Cell 2019). A CRISPR/Cas9 screen spotlighted the hypoxia response and suggested that shifting metabolism from oxidative phosphorylation towards glycolysis can alleviate growth defects in cultured cells. In cell culture, forced activation of this pathway is sufficient to suppress the growth defects in cells with impaired electron transport chains (Jain et al., 2016; Li et al., 2018). However, subsequent clues suggested that this pathway may be insufficient for the hypoxic rescue in vivo of the Ndufs4 KO mouse. For example, intermittent hypoxia and more moderate hypoxia were able to trigger HIF-dependent hematocrit elevation but did not result in even an intermediate rescue (Ferrari et al., 2017). As shown herein, genetically activating the hypoxia transcriptional program by decreasing or eliminating activity of PHD1/2/3 or vHL was insufficient to rescue brain disease, even though canonical HIF targets were activated.

Mitochondria are widely regarded as the energy-producing organelles of the cell and the textbook explanation for mitochondrial disease is centered on defective ATP production. However, in most tissues mitochondria are also the primary oxygen-consumers, allowing intracellular oxygen tensions to remain low and preventing the toxic oxidation of intracellular biomolecules. In fact, humans with mitochondrial disease are known to exhibit venous hyperoxia and impaired oxygen extraction which is most apparent during exercise (Taivassalo et al., 2002), and this venous hyperoxia has even been proposed as a biomarker for the disease. As shown herein, with advanced disease complex I (CI) deficiency results in a decline in whole body oxygen consumption. This is associated with elevated brain tissue $PO_2$, which is normalized by chronic hypoxic exposure. A recent study showed that the defect in CI-mediated electron transport occurs in a regional and temporal manner in the Ndufs4 KO mouse. Kayser et al. showed that CI activity is relatively well-preserved in young mice but declines with age (Kayser et al., 2016). It is tempting to speculate that a vicious cycle could lead to the end pathology: an initial defect in mitochondrial CI could lead to local hyperoxia that exacerbates mitochondrial dysfunction, creating a feed-forward loop of ETC damage. Since whole body oxygen consumption declines with age, it is likely that other tissues are also experiencing relative hyperoxia in KO mice.

Without wishing to be bound by theory, the present disclosure proposes that in the face of mitochondrial dysfunction, unused oxygen can accumulate and this can be directly toxic. Oxygen toxicity is traditionally associated with the damaging effects of superoxide radicals or hydrogen peroxide. In principle, the generation of such reactive oxygen species should be higher in the brains of Ndufs4 KO mice, as both NADH and $O_2$ can contribute to the generation of toxic reactive oxygen species (Kussmaul et al., 2006; Hirst et al., 2008). Complex I deficiency leads to a direct increase in NADH/NAD+ ratio and as shown herein will lead to increased brain $O_2$ tensions in vivo. Moreover, an impaired ETC with structural defects may cause increased one-electron leak to molecular oxygen. However, isolated mitochondria from KO and WT mice produced similar amounts of $H_2O_2$ at a given oxygen tension, when respiring on malate and pyruvate. If ROS are the culprit species, KO mice may be producing greater amounts of ROS simply because more oxygen is available as a substrate. An alternative hypothesis for oxygen toxicity is that the increased oxygen levels may be directly oxidizing and damaging biomolecules, e.g., those containing Fe—S clusters or iron centers, without the need to invoke the formation of toxic reactive oxygen species, as we have recently shown for the Fe—S cluster biosynthetic machinery itself (Ast et al., 2019). Consistent with this perhaps unconventional hypothesis for oxygen toxicity, various antioxidant strategies have been tested in mitochondrial diseases with little or no proven benefit. It is possible that hypoxia is more effective than antioxidants, since it prevents oxygen toxicity at its root base.

A key finding from the current work is that very different strategies that reduce brain oxygenation are protective in the Ndufs4 KO mouse model of Leigh syndrome. Previous work (Ferrari et al., 2017; Jain et al., 2016) utilized hypoxic gas mixtures to create normobaric inhaled hypoxia. Provided herein is the use of two different strategies to reduce oxygen delivery to also alleviate disease in this mouse model. First, we have demonstrated that lowering brain tissue $PO_2$ by using CO to decrease arterial oxygen content (without altering arterial $PO_2$), is sufficient to rescue disease (FIGS. 3A-H). Second, we have used severe anemia (through a mix of an iron deficient diet and phlebotomy) to reduce oxygen delivery to the brain (FIGS. 4A-E). These interventions serve as proof-of-concept that decreasing arterial oxygen content (rather than arterial $PaO_2$) or overall oxygen delivery should rescue disease by lowering tissue $PO_2$. Although low-dose CO (250 ppm) is known to have anti-inflammatory effects and is in phase 1 clinical trials for idiopathic pulmonary fibrosis (Rosas et al., 2018) in humans, its therapeutic index is narrow. Phlebotomy is used as a therapy for other disorders, including hemochromatosis, however anemia is known to be a risk factor for worse prognosis in certain inherited mitochondrial diseases including POLG deficiency (Hikmat et al., 2017); thus in some embodiments the present methods are not used to treat mitochondrial disease associated with POLG deficiency. While hypoxia breathing, inhaled CO, and severe anemia are each individually highly pleiotropic and could be having a beneficial effect on the Ndufs4 KO mice by distinct mechanisms, the most parsimonious explanation is that they are all alleviating Leigh syndrome by directly reducing brain oxygen tensions.

These results indicate that other approaches, such as small molecule HIF inhibitors, including those now in trials for renal cell cancer (Martinez-Sáez et al., 2017), may be more practical to limit an adaptive increase in RBC production, or orally available oxy-Hb left-shifters, including those now in clinical trials for sickle cell anemia [25], can be used to treat mitochondrial diseases including Leigh syndrome.

Methods of Treatment

The present disclosure demonstrated that oxygen consumption is impaired and brain oxygen tissue levels increase in KO mice, likely resulting in increased oxygen toxicity. As shown herein, chronic hypoxic breathing normalizes brain PO2 in Ndufs4 KO mice, and that other diverse interventions that reduce brain oxygen levels are effective at preventing neurological disease.

The methods described herein include methods for the treatment of disorders associated with mitochondrial dysfunction, including rare, inborn errors of metabolism caused by genetic mutations; neurodegenerative disease; diabetes; and aging and age-associated decline. Generally, the methods include administering a therapeutically effective amount of one or more treatments that (i) induce hemoglobin "left-shifting" and/or (ii) induce anemia, as described herein, to a subject who is in need of, or who has been determined to be in need of, such treatment.

In some embodiments, the subject has a mitochondrial disorder, e.g., comprises mitochondria comprising one or more mitochondrial lesions or other lesions which impact mitochondrial respiratory chain function. In some embodiments, the one or more mitochondrial lesions may be introduced by oxidative stress. In some embodiments, the one or more mitochondrial lesions occur in a respiratory chain complex. In certain embodiments, the one or more mitochondrial lesions occur in a protein complex, wherein the protein complex is selected from the group consisting of: Complex I, Complex II, Complex III, Complex IV, Complex V, and ATP (adenosine triphosphate) Synthase.

In some embodiments, the mitochondrial disorder is a genetic disorder that affects the mitochondrial oxidative phosphorylation system. In some embodiments, the mitochondrial disorder affects one or more of the five respiratory chain complexes. In certain embodiments, the respiratory chain complexes is selected from the group consisting of Complex I (NADH-coenzyme Q reductase or NADH dehydrogenase), Complex II (succinate-coenzyme Q reductase or succinate dehydrogenase), Complex III (cytochrome $bc_1$ complex or ubiquinone-cytochrome C oxidoreductase), Complex IV (cytochrome C oxidase), and Complex V (ATP synthase). In some embodiments, a mitochondrial disorder involves one or more of the following diseases myopathy (muscle disease), mitochondrial encephalomyopathy (brain and muscle disease), fatal infantile multisystem disorder. In some embodiments, the disorder is In some embodiments, a mitochondrial disorder is characterized by a mutation in a gene selected from the group consisting of AARS2, AASS, ABAT, ABCB6, ABCB7, ABCD1, ACACA, ACAD8, ACAD9, ACADM, ACADS, ACADSB, ACADVL, ACAT1, ACO2, ACSF3, ACSL4, ADCK3, ADCK4, AFG3L2, AGK, AGXT, AIFM1, AK2, ALAS2, ALDH18A1, ALDH2, ALDH3A2, ALDH4A1, ALDH5A1, ALDH6A1, ALDH7A1, AMACR, AMT, APOPT1, ATIC, ATP5A1, ATP5E, ATP6, ATP8, ATPAF2, ATXN2, AUH, BAX, BCKDHA, BCKDHB, BCKDK, BCS1L, BOLA3, C10orf2, C12orf65, CASA, CARS2, CASP8, CAT, CEP89, CHCHD10, CISD2, CLPB, CLPP, COA5, COAG, COASY, COQ2, COQ4, COQ6, COQ9, COX1, COX10, COX14, COX15, COX2, COX20, COX3, COX4I2, COX6A1, COX6B1, COX7B, CPDX, CPS1, CPT1A, CPT2, CYB5A, CYB5R3, CYC1, CYCS, CYP11A1, CYP11B2, CYP24A1, CYP27A1, CYP27B1, CYTB, D2HGDH, DARS2, DBT, DGUOK, DHCR24, DHODH, DHTKD1, DIABLO, DLAT, DLD, DMGDH, DMPK, DNA2, DNAJC19, DNM1L, EARS2, ECHS1, ELAC2, ETFA, ETFB, ETFDH, ETHEL FARS2, FASTKD2, FBXL4, FECH, FH, FKBP10, FOXRED1, FXN, GARS, GATM, GCDH, GCSH, GDAP1, GFER, GFM1, GK, GLDC, GLRX5, GLUD1, GLYCTK, GPI, GPX1, GRHPR, GTPBP3, HADH, HADHA, HADHB, HARS2, HCCS, HIBCH, HK1, HMBS, HMGCL, HMGCS2, HOGA1, HSD17B10, HSD17B4, HSPD1, HTRA2, IDH2, IDH3B, ISCA2, ISCU, WD, KARS, KIF1B, KRT5, L2HGDH, LARS2, LIAS, LONP1, LRPPRC, LYRM4, LYRM7, MAOA, MARS2, MCCC1, MCCC2, MCEE, MFN2, MGME1, MICU1, MLH1, MLYCD, MMAB, MMACHC, MMADHC, MOCS1, MPC1, MPV17, MRPL12, MRPL3, MRPL44, MRPS16, MRPS22, mt-12S rRNA, mt-tRNATyr, mt-tRNATrp, mt-tRNAVal, mt-tRNAThr, mt-tRNASer1, mt-tRNASer2, mt-tRNAArg, mt-tRNAGln, mt-tRNAPro, mt-tRNAAsn, mt-tRNAMet, mt-tRNALeu1, mt-tRNALeu2, mt-tRNALys, mt-tRNAIle, mt-tRNAHis, mt-tRNAGly, mt-tRNAPhe, mt-tRNAGlu, mt-tRNAAsp, mt-tRNACys, mt-tRNAAla, MTFMT, MTO1, MTPAP, MUT, MUTYH, NAGS, NARS2, NCOA4, ND1, ND2, ND3, ND4, ND4L, ND5, ND6, NDUFA1, NDUFA10, NDUFA11, NDUFA12, NDUFA2, NDUFA4, NDUFA9, NDUFAF1, NDUFAF2, NDUFAF3, NDUFAF4, NDUFAF5, NDUFAF6, NDUFB11, NDUFB3, NDUFB9, NDUFS1, NDUFS2, NDUFS3, NDUFS4, NDUFS6, NDUFS7, NDUFS8, NDUFV1, NDUFV2, NFU1, NNT, NUBPL, OAT, OGDH, OGG1, OPA1, OPA3, OTC, OXCT1, PAM16, PANK2, PARK7, PARS2, PC, PCCA, PCCB, PCK2, PDHA1, PDHB, PDHX, PDP1, PDSS1, PDSS2, PET100, PEX11B, PEX6, PHYH, PINK1, PNPO, PNPT1, POLG, POLG2, PPM1K, PPDX, PRODH, PTRH2, PTS, PUS1, PYCR1, QDPR, RARS, RARS2, RMND1, RPL35A, RPS14, RRM2B, SARS2, SCO1, SCO2, SCP2, SDHA, SDHAF1, SDHAF2, SDHB, SDHC, SDHD, SECISBP2, SERAC1, SFXN4, SLC16A1, SLC19A3, SLC25A1, SLC25A12, SLC25A13, SLC25A15, SLC25A19, SLC25A20, SLC25A22, SLC25A3, SLC25A38, SLC25A4, SNAP29, SOD1, SPG7, SPR, SPTLC2, STAR, SUCLA2, SUCLG1, SUOX, SURF1, TACO1, TARS2, TAZ, TCIRG1, TIMM8A, TK2, TMEM126A, TMEM70, TMLHE, TPI1, TRIT1, TRMU, TRNT1, TSFM, TTC19, TUBB3, TUFM, TYMP, UNG, UQCR10, UQCRB, UQCRC2, UQCRQ, VARS2, WDR81, WFS1, XPNPEP3, and YARS2. In some embodiments, a subject has been identified as having a genetic mutation associated with onset of a mitochondrial disorder (e.g., a mutation in one of the genes identified above) and treatment is initiated before the onset of symptoms of the disorder. In some embodiments, a mitochondrial disorder is characterized by a point mutation in the mitochondrial DNA (mtDNA), deletion within the mtDNA, duplication within the mtDNA, or depletion of the mtDNA.

In some embodiments, a mitochondrial disorder is Kearns-Sayre syndrome (KSS), Leber's hereditary optic neuropathy (LHON), myoclonic epilepsy ragged red fiber syndrome (MERRF), mitochondrial encephalopathy, lactic acidosis, and stroke (MELAS) syndrome, sensory ataxic neuropathy, dysarthria, and ophthalmoparesis (SANDO) syndrome, maternally inherited Leigh syndrome (MILS), myopathy and external ophthalmoplegia, neuropathy, gastrointestinal encephalopathy (MNGIE) syndrome, Leigh syndrome, maternally inherited diabetes and deafness (MIDD) syndrome, Alpers-Huttenlocher syndrome, Sengers syndrome, mitochondrial myopathy, lactic acidosis and sideroblastic anemia (MLASA), chronic progressive external ophthalmoplegia (CPEO), autosomal dominant progressive external ophthalmoplegia (AdPEO), neuropathy, ataxia, retinitis pigmentosa (NARP) syndrome, GRACILE syndrome, diabetes insipidus, diabetes mellitus, optic atrophy, and deafness (DIDMOAD) syndrome, or Pearson's syndrome.

In some embodiments, the disorder is Friedreich's ataxia; as shown in Ast et al Cell 2019, hypoxia breathing was shown to prevent neurological disease in a mouse model. Friedreich's ataxia is the most common rare mitochondrial disorder.

In some embodiments, a mitochondrial disorder presents with one or more of gray matter disease, white matter disease, seizures, migraines, ataxia, stroke, stroke-like episodes, deafness, optic neuropathy, peripheral neuropathy, retinopathy, external opthalmoplegia, liver failure, kidney failure, pancreatic exocrine dysfunction, intestinal pseudoobstruction, anemia, skeletal muscle myopathy, cardiomyopathy, cardiac conduction defects, short stature, hypogonadism, immune dysfunction, or metabolic acidosis.

In some embodiments, the mitochondrial disorder is diagnosed by an algorithm selected from the group consisting of the Bernier criteria (Bernier et al., "Diagnostic criteria for respiratory chain disorders in adults and children," Neurology, 59(9):1406-11, 2002), the Morava criteria (Morava et al., "Mitochondrial disease criteria: diagnostic applications in children," Neurology, 67(10):1823-6, 2006), and Consensus from the Mitochondrial Medicine Society (Parikh et al., "Diagnosis and management of mitochondrial disease: a consensus statement from the Mitochondrial Medicine Society," Genetics in Medicine, 17(9):689-701, 2015).

In some embodiments, a subject exhibits mitochondrial dysfunction associated with aging. The subject can be, e.g., at least 65 years of age, at least 70 years of age, at least 75 years of age, or at least 80 years of age.

In some embodiments, the subject is treated to prevent (completely or partially) the occurrence of mitochondrial dysfunction associated with aging. The subject can be, e.g., at least 15 years of age, at least 20 years of age, at least 25 years of age, at least 30 years of age, at least 35 years of age, or at least 40 years of age. The subject in these embodiments need not exhibit mitochondrial dysfunction or other form of evident disease.

In some embodiments, a subject exhibits mitochondrial dysfunction that occurs in response to an environmental insult such as ingestion of antibiotics (e.g., tetracycline, chloramphenicol, or aminoglycosides), antivirals (e.g., stavudine), pesticides (e.g., rotenone), or licit drugs (e.g., MPTP) that are toxic to mitochondria.

In some embodiments, the method of treatment, reduces or treats one or more symptoms of the mitochondrial disease. For example, symptoms mays include loss of motor control (e.g., ataxia (abnormal muscle coordination), dystrophic posturing, involuntary movements, and myoclonus), muscle weakness and pain (e.g., dystonia, hypotonia, lethargy, and myopathy), gastro-intestinal disorders and swallowing difficulties, poor growth, cardiac disease, liver disease, diabetes, respiratory complications (e.g., respiratory failure), seizures, dementia, coma, visual problems (e.g., eye muscle paralysis, nystagmus, ophthalmoplegia, optic atrophy, and pigmentary retinopathy (retinal color changes with loss of vision)), hearing problems (e.g., hearing loss), sensory neuropathy (nerve damage involving the sense organs), lactic acidosis, developmental delays and susceptibility to infection.

In some embodiments, a subject has an oxidative stress disorder. Examples of oxidative stress disorders include neurodegenerative diseases such as Parkinson's disease, Alzheimer's disease, amyotrophic lateral sclerosis, Huntington's disease, multiple sclerosis; Asperger syndrome, attention deficit hyperactivity disorder, diabetes, cardiovascular disease, cancer, Lafora disease, atherosclerosis, heart failure, myocardial infarction, fragile X syndrome, sickle cell disease, lichen planus, vitiligo, and autism.

In some embodiments, the subject has an age-associated disorder. In some embodiments, the age-associated disorder is selected from the group consisting of type 2 diabetes, neurodegeneration (e.g., Alzheimer's disease), sarcopenia (muscle loss), insulin resistance, peripheral neuropathy, muscle atrophy, deafness, atherosclerosis, cardiovascular disease, heart failure, chronic kidney disease, cancer, arthritis, cataracts, and osteoporosis. In other embodiments, the age-associated disorder is selected from the group consisting of type 2 diabetes, neurodegeneration and sarcopenia. The subject can be, e.g., at least 15 years of age, at least 20 years of age, at least 25 years of age, at least 30 years of age, at least 35 years of age, at least 40 years of age, at least 50 years of age, or at least 60 years of age. The subject in these embodiments need not exhibit mitochondrial dysfunction or other form of evident disease.

Treatments to Induce Hemoglobin Left Shifting

The present methods can include administering a treatment that will induce "left shifting" of hemoglobin. A "left shift" refers to a change in the hemoglobin-O2 dissociation curve, and leftward movement of the curve is a sign of hemoglobin's increased affinity for oxygen, i.e., indicates that the hemoglobin under study has an increased affinity for oxygen so that hemoglobin binds oxygen more easily, and releases it more slowly. As shown in the present application, inhaled carbon monoxide (CO), a classic hemoglobin left shifter, can be used in the present methods (see, e.g., Hess, Respiratory Care October 2017, 62 (10) 1333-1342; WO2008003953; U.S. Pat. No. 8,389,572; Romão et al., Chem Soc Rev. 2012; 41(9):3571-8; Gullotta et al., IUBMB Life. 2012; 64(5):378-86). In some embodiments, sufficient CO is delivered to provide an average carboxyhemoglobin level of at least 10%, 15%, 20%, 25%, 30%, or 35%, e.g., with a maximum average level of up to about 20%, 25%, 30%, 35%, or 40%, e.g., with a maximum instantaneous levels (e.g., immediately or shortly after dosing) of about 20%, 25%, 30%, 35%, or 40%. In some embodiments, sufficient CO is delivered to provide an average carboxyhemoglobin level of 10-20% or 10-15%. In some embodiments, CO is delivered in discrete doses, e.g., as "puff therapy", rather than as a continuously administered dose. In mice, carboxyhemoglobin is rapidly cleared, so carbon monoxide must be given continuously. In humans clearance of carboxyhemoglobin is slower, which raises the possibility of "puff therapy," e.g., wherein the subject receives a small dose multiple times per day, e.g., one, two, three, four or more times per day. In some embodiments the subject is given a puff in the morning and a puff in the evening. Such discrete doses can be used gently and durably (in humans) left-shift the hemoglobin. In some embodiments, vaping devices or modified vaping devices are used.

Carbon monoxide-releasing molecules (CORMs) may also be used, e.g., organometallic carbonyl complexes such as CORM-1, CORM-2, CORM-3, CORM-401, ALF492, CORM-A1, B12-ReCORM-2, Re-CORM-1, CORMA-1-PLA and ALF186 as well as nonmetallic compounds and enzyme-triggered CORMs (ET-CORMS) (see, e.g., Faizan et al., Materials (Basel). 2019 May; 12(10): 1643; Schatzschneider, Br J Pharmacol. 2015 March; 172(6): 1638-1650).

In some embodiments, small molecule allosteric effectors of Hb (AEHs) that left shift Hb can be used. Examples include hydroxyurea, VOXELOTOR (previously GBT440) is being developed as an orally available left shifter for sickle cell anemia (Dufu and Oksenberg, Hematol Rep. 2018; 10(2):7419. Published 2018 May 14), and other drugs that modify hemoglobin, e.g., by forming a Schiff base adduct with the globin N-termini and stabilizing hemoglobin its oxy configuration (e.g., substituted benzaldehydes such as BW12C (Merrett et al., Biochem J. 1986; 239(2):387-392; Beddell et al., Br J Pharmacol. 1984; 82(2):397-407; Zaugg et al., J. Biol. Chem. 1977; 252:8542-8548); Tucaresol (Arya et al., Br J Haematol. 1996; 93(4):817-821); aliphatic isothiocyanates (e.g., alkyl isothiocyanate and aryl isothiocyanate); and aromatic aldehydes such as vanillin, thiazo-vanillin, furfural, 5-Hydroxymethyl-2-furfural (5-HMF), and 5-ethyl-2-furfural (5-EF) (Abdulmalik et al., Brit J Haematol. 2005; 128(4):552-561); and pyridyl derivatives of vanillin INN-312 and INN-298; see, e.g., Hebbel and Hedlund, Am J Hematol. 2018; 93:321-325; Safo and Kato, Hematol Oncol Clin North Am. 2014 April; 28(2): 217-231.

Alternatively, gene therapy can be used to promote expression of fetal hemoglobin (HbF), which is naturally left-shifted, e.g., targeting BCL11A, a transcriptional repressor required to maintain silencing of fetal hemoglobin expression. For example, ex vivo editing of autologous stem cells using CRISPR RNA-guided genome editing, e.g., using a nuclease or base editor (e.g., as described in Antoniani et al., (Blood. 2018; 131(17):1960-1973) or RNA interference/small hairpin RNAs (e.g., using a lentiviral vector expressing a short-hairpin RNA targeting BCL11A (see, e.g., Guda et al., Mol Ther. 2015 September; 23(9): 1465-74; Brendel et al., J Clin Invest. 2016; 126(10):3868-3878; Wilber et al., Blood. 2011 Mar. 10; 117(10):2817-26) or siRNA (see, e.g., Taghavi et al., Indian J Hematol Blood Transfus. 2019 October; 35(4):758-764) can be used; see, e.g., Hoban et al., Blood. 2016 Feb. 18; 127(7): 839-848. The sequence of the human BCL11A gene is in GenBank at RefSeqGene ID. NG 011968.1 (Range 4845-107979).

Treatments to Induce Anemia

Alternatively or in addition, the present methods can include administering a treatment that will induce anemia, e.g., sufficient to correspond to an FIO$_2$ of 10-20%, 10-15%, e.g., 10-12%, e.g., 11%, or levels below 13.2 to 16.6 grams (g) of hemoglobin per deciliter (dL) of blood for men, 11.6 to 15. g/dL for women, or less than approximately 13.5 g/dL (135 g/L) in a child age 6 to 12 years. In some embodiments, such a treatment can include the use of bloodletting (phlebotomy). Alternatively, small molecule compounds that induce anemia, including hypoxia inducible factor (HIF)-2alpha (HIF-2a) inhibitors, can be used; such inhibitors cause anemia because HIF2 helps to make red blood cells. HIF2 inhibitors include PT2399, PT2977, PT2385, and PT2567, the latter two of which are currently in clinical trials for cancer, that have an on-target effect of inducing anemia. Some of the structures are shown below; the molecules can be obtained from commercial sources including MedChemExpress or from Peloton Therapeutics, Inc.

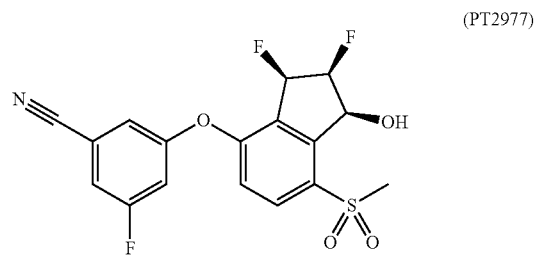

2

PT2399

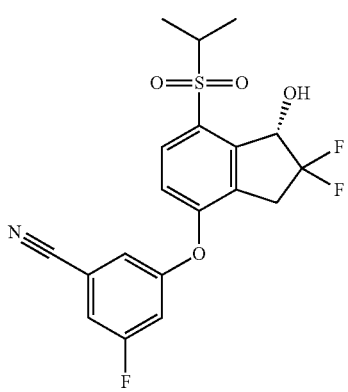

PT2385

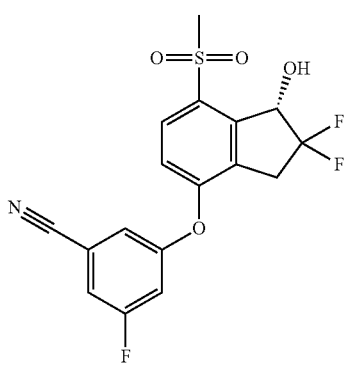

The methods can also include use of inhibitors disclosed in Wehn et al., J. Med. Chem. 2018, 61, 21, 9691-9721; Wehn et al., Journal of Medicinal Chemistry 2019, 62, 15, 6876-6893 (PT2977); U.S. Ser. No. 10/155,726; US20160368893; U.S. Pat. No. 9,796,697; or US20190015377 (e.g., compounds 163, 226, or 231 disclosed therein, as shown below).

Compound 163

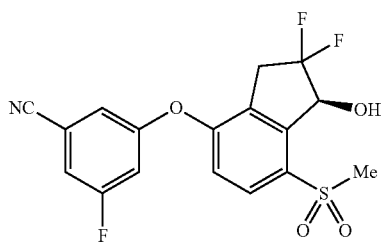

Compound 226

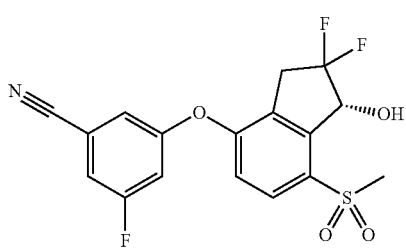

Compound 231

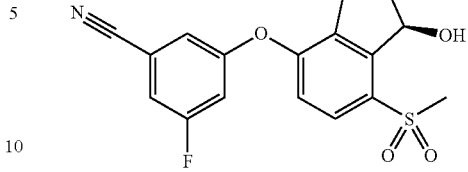

Other HIF-2a inhibitors can also be used, e.g., as described in WO2018160772, e.g., cardiac glycoside, such as digoxin, ouabain, proscillaridin A, digitoxin, acetydigitoxin, convallatoxin, peruvoside, strophanthin K, nerifolin, cymarin, or periplocymarin (see e.g., Zhang et al., Proc. Natl. Acad. Sci. USA 105: 19579-19586, 2008), rapamycin or an analog thereof (such as rapamycin, everolimus, temsirolimus, or tacrolimus), an anthracycline or analog thereof (such as doxorubicin or daunorubicin), a proteasome inhibitor (such as bortezomib (PS-341)), or camptothecin or an analog thereof (such as CRLX-101, SN-38, EZN-2208, irinotecan, or topotecan). In additional examples, a HIF-2a small molecule inhibitor includes echinomycin (see, e.g., Kong et al., Cancer Res. 65:9047-9055, 2005), 17-allylamino-17-demethoxygeldanamycin (see, e.g., Liu et al., Mol. Cell 25:207-217, 2007), 17-dimethylaminoethylamino-17-demethoxygeldanamycin (e.g., WO 02/079167), NSC 644221 (see, e.g., Creighton-Gutteridge et al., Clin. Cancer Res. 13: 1010-1018, 2007), YC-1 (e.g., Yeo et al., J. Natl. Cancer Inst. 95:498-499, 2003), PX-478 (see, e.g., U.S. Pat. No. 7,399,785), 2-methoxyestradiol or derivatives thereof (e.g., ENMD-1198 or ENMD-2076), wondonin (e.g., Jun et al., FEBS Lett. 581:4977-4982, 2007), Palomid-529 (Paloma Pharmaceuticals), CLT-003 (Charlesson), cyclopentabenzofuranes (e.g., IMD-026260; WO 2010/063471), furoquinoline-based molecules (e.g., Lohar et al., Bioorg. Med. Chem. Lett. 18:3603-3606, 2008), BAY 87-2243, BTG-6228 (BTG), or KC7F2 (e.g., Naria et al., Clin. Cancer Res. 15:6128-6136, 2009); alpha-ketoglutarates (e.g., WO 06/016143); P3155 or P2630 (e.g., Kumar et al., Bioorg. Med. Chem. Lett. 20:6426-6429, 2010); EL-102 (McLaughlin et al., American Association for Cancer Research, Abstract LB-385, 2011); CX-4715 or CX-3800 series compounds (Cylene Pharmaceuticals), or N-(3-Chloro-5-fluorophenyl)-4-nitrobenzo[c][1,2,5]oxadiazol-5-amine (HIF-2 antagonist 2). See also Li et al., Journal of Medicinal Chemistry 2019, 62, 12, 5725-5749.

Other drugs known to cause hemolytic anemia include cephalosporins; dapsone; levodopa; levofloxacin; pmethyldopa; nitrofurantoin; nonsteroidal anti-inflammatory drugs (NSAIDs); penicillin and its derivatives; phenazopyridine (pyridium); alkylating agents; the plant alkaloids vinblastine and vincristine; antibiotics used in cancer chemotherapy; and quinidine. See also Girdwood, Drugs. 1976; 11(5):394-404.

Pharmaceutical Compositions and Methods of Administration

The methods described herein include the use of pharmaceutical compositions comprising an active ingredient described herein.

Pharmaceutical compositions typically include a pharmaceutically acceptable carrier. As used herein the language "pharmaceutically acceptable carrier" includes saline, solvents, dispersion media, coatings, antibacterial and antifungal agents, isotonic and absorption delaying agents, and the like, compatible with pharmaceutical administration. Pharmaceutical compositions are typically formulated to be compatible with its intended route of administration. Examples of routes of administration include parenteral, e.g., intravenous, intradermal, subcutaneous, oral (e.g., inhalation), transdermal (topical), transmucosal, and rectal administration.

Methods of formulating suitable pharmaceutical compositions are known in the art, see, e.g., *Remington: The Science and Practice of Pharmacy*, 21st ed., 2005; and the books in the series *Drugs and the Pharmaceutical Sciences: a Series of Textbooks and Monographs* (Dekker, NY). For example, solutions or suspensions used for parenteral, intradermal, or subcutaneous application can include the following components: a sterile diluent such as water for injection, saline solution, fixed oils, polyethylene glycols, glycerine, propylene glycol or other synthetic solvents; antibacterial agents such as benzyl alcohol or methyl parabens; antioxidants such as ascorbic acid or sodium bisulfite; chelating agents such as ethylenediaminetetraacetic acid; buffers such as acetates, citrates or phosphates and agents for the adjustment of tonicity such as sodium chloride or dextrose. pH can be adjusted with acids or bases, such as hydrochloric acid or sodium hydroxide. The parenteral preparation can be enclosed in ampoules, disposable syringes or multiple dose vials made of glass or plastic.

Pharmaceutical compositions suitable for injectable use can include sterile aqueous solutions (where water soluble) or dispersions and sterile powders for the extemporaneous preparation of sterile injectable solutions or dispersion. For intravenous administration, suitable carriers include physiological saline, bacteriostatic water, Cremophor EL™ (BASF, Parsippany, NJ) or phosphate buffered saline (PBS). In all cases, the composition must be sterile and should be fluid to the extent that easy syringability exists. It should be stable under the conditions of manufacture and storage and must be preserved against the contaminating action of microorganisms such as bacteria and fungi. The carrier can be a solvent or dispersion medium containing, for example, water, ethanol, polyol (for example, glycerol, propylene glycol, and liquid polyetheylene glycol, and the like), and suitable mixtures thereof. The proper fluidity can be maintained, for example, by the use of a coating such as lecithin, by the maintenance of the required particle size in the case of dispersion and by the use of surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, polyalcohols such as mannitol, sorbitol, sodium chloride in the composition. Prolonged absorption of the injectable compositions can be brought about by including in the composition an agent that delays absorption, for example, aluminum monostearate and gelatin.

Sterile injectable solutions can be prepared by incorporating the active compound in the required amount in an appropriate solvent with one or a combination of ingredients enumerated above, as required, followed by filtered sterilization. Generally, dispersions are prepared by incorporating the active compound into a sterile vehicle, which contains a basic dispersion medium and the required other ingredients from those enumerated above. In the case of sterile powders for the preparation of sterile injectable solutions, the preferred methods of preparation are vacuum drying and freeze-drying, which yield a powder of the active ingredient plus any additional desired ingredient from a previously sterile-filtered solution thereof.

Oral compositions generally include an inert diluent or an edible carrier. For the purpose of oral therapeutic administration, the active compound can be incorporated with excipients and used in the form of tablets, troches, or capsules, e.g., gelatin capsules. Oral compositions can also be prepared using a fluid carrier for use as a mouthwash. Pharmaceutically compatible binding agents, and/or adjuvant materials can be included as part of the composition. The tablets, pills, capsules, troches and the like can contain any of the following ingredients, or compounds of a similar nature: a binder such as microcrystalline cellulose, gum tragacanth or gelatin; an excipient such as starch or lactose, a disintegrating agent such as alginic acid, Primogel, or corn starch; a lubricant such as magnesium stearate or Sterotes; a glidant such as colloidal silicon dioxide; a sweetening agent such as sucrose or saccharin; or a flavoring agent such as peppermint, methyl salicylate, or orange flavoring.

For administration by inhalation, the compounds can be delivered in the form of an aerosol spray from a pressured container or dispenser that contains a suitable propellant, e.g., a gas such as carbon dioxide, or a nebulizer. Such methods include those described in U.S. Pat. No. 6,468,798.

Systemic administration of a therapeutic compound as described herein can also be by transmucosal or transdermal means. For transmucosal or transdermal administration, penetrants appropriate to the barrier to be permeated are used in the formulation. Such penetrants are generally known in the art, and include, for example, for transmucosal administration, detergents, bile salts, and fusidic acid derivatives. Transmucosal administration can be accomplished through the use of nasal sprays or suppositories. For transdermal administration, the active compounds are formulated into ointments, salves, gels, or creams as generally known in the art.

Therapeutic compounds that are or include nucleic acids can be administered by any method suitable for administration of nucleic acid agents, such as a DNA vaccine. These methods include gene guns, bio injectors, and skin patches as well as needle-free methods such as the micro-particle DNA vaccine technology disclosed in U.S. Pat. No. 6,194,389, and the mammalian transdermal needle-free vaccination with powder-form vaccine as disclosed in U.S. Pat. No. 6,168,587. Additionally, intranasal delivery is possible, as described in, inter alia, Hamajima et al., Clin. Immunol. Immunopathol., 88(2), 205-10 (1998). Liposomes (e.g., as described in U.S. Pat. No. 6,472,375) and microencapsulation can also be used. Biodegradable targetable microparticle delivery systems can also be used (e.g., as described in U.S. Pat. No. 6,471,996).

In one embodiment, the therapeutic compounds are prepared with carriers that will protect the therapeutic compounds against rapid elimination from the body, such as a controlled release formulation, including implants and microencapsulated delivery systems. Biodegradable, biocompatible polymers can be used, such as ethylene vinyl acetate, polyanhydrides, polyglycolic acid, collagen, polyorthoesters, and polylactic acid. Such formulations can be prepared using standard techniques, or obtained commercially, e.g., from Alza Corporation and Nova Pharmaceuticals, Inc. Liposomal suspensions (including liposomes targeted to selected cells with monoclonal antibodies to cellular antigens) can also be used as pharmaceutically acceptable carriers. These can be prepared according to methods known to those skilled in the art, for example, as described in U.S. Pat. No. 4,522,811.

The pharmaceutical compositions can be included in a container, pack, or dispenser together with instructions for administration.

EXAMPLES

The invention is further described in the following examples, which do not limit the scope of the invention described in the claims.

Materials and Methods

The following materials and methods were used in the Examples below.

Experiments were conducted in experimental and technical replicates (sample size described throughout figures). Mice were randomized within each genotype. Careful consideration was used to ensure groups were balanced for gender, age and starting weight. When possible, samples were blinded. For example, survival curves, body weight measurements, brain PO2 measurements, etc. were all made blinded. Sample sizes and power calculations were based on data from previous studies using the Ndufs4 KO mouse model (Ferrari et al., 2017; Jain et al., 2016).

Mice

All animal work in manuscript was approved by the Subcommittee on Research Animal Care and the Institutional Animal Care and Use Committee of Massachusetts General Hospital. Ndufs4$^{-/-}$ were obtained from Palmiter laboratory (University of Washington). Mice lacking Phd1 (Aragones et al., 2008), Nestin-Phd2 (Mazzone et al., 2009) and Phd3 (Bishop et al., 2008) were provided by the Carmeliet laboratory (KU Leuven). Vh1L$^{ch/ch}$ mice were provided by Josef Prchal (University of Utah). Genetic crosses were performed by crossing Ndus4$^{+/-}$ mice with remaining strains. Throughout this study, Ndufs4$^{+/+}$ and Ndufs4$^{+/-}$ mice were indiscriminately used as healthy controls, since there is no apparent phenotypical difference between these genotypes. When possible, controls from the same genetic cross were used, in order to make comparisons between reasonably similar genetic backgrounds. Pups were genotyped and weaned from mothers at 25-30 d of age. Cages and water were changed weekly. Humane euthanasia criteria were used throughout the study. Natural death or 20% body weight loss were used to generate survival curves.

Animals were housed in either conventional or barrier housing. Males and females were used throughout the study. The NDUFS4, PHD1 and PHD3 KO strain are C57/BL6. The Nestin-PHD2 strain is mixed background (C57/BL6 and 129S6).

Respirometry

Whole body oxygen consumption was monitored using the Sable system (Promethion Cages) continuously from ~30 d to ~45 d of age. During the experiment, mice were continuously provided food/water and exposed to a day/night cycle of 12 h/12 h. A smoothening window of 3 h was used for each timepoint during the analysis. Oxygen consumption values were normalized to body weight.

$H_2O_2$ Assay

A high-resolution respirometer (O2k, Oroboros Instruments GmbH) equipped with home-built two-channel fluorescence optical module was used to monitor simultaneously oxygen concentration and H2O2 production as described in detail in [14]. The module was connected to the amperometric port of the respirometer and the fluorescence was recorded using the Datlab software. Mitochondrial H2O2 release was measured as the fluorescence of resorufin formed from Amplex UltraRed in the presence of horseradish peroxidase (excitation 525 nm, emission filter 580 nm cut off). The fluorescence signal was calibrated into an H2O2 concentration by addition of 90 nM of H2O2 to the chamber at the end of each experiment. To assess H2O2 release at different oxygen level, humidified gaseous pre-purified argon was purged into the 1 ml gas headspace of respirometer chamber at a flow rate of 10-60 ml/min to rapidly decrease oxygen concentration in the measuring assay.

Intact brain mitochondria (0.1-0.5 mg/ml) were added to assay media containing 125 mM KCl, 14 mM NaCl, 0.2 mM EGTA, 4 mM KH2PO4, 2 mM MgCl2, 20 mM HEPES-Tris (pH 7.4), supplemented with 2 mg/ml BSA, 10 μM Amplex UltraRed, 4 U/ml horseradish peroxidase, and 40 U/ml Cu/Zn superoxide dismutase at 37° C. Combination of 2 mM malate and 5 mM pyruvate was used to reduce matrix NADH for respiration mediated by CI. Pyruvate is oxidized by pyruvate dehydrogenase generating NADH and acetyl-CoA which reacts with matrix oxaloacetate to shift the malate dehydrogenase reaction towards oxidation of malate and generation of another NADH molecule.

Brain Tissue $PO_2$ Measurement

Ndufs4$^{-/-}$ and WT mice were anesthetized with Isoflurane (induction at 2-4%, maintenance at 1-1.5%), intubated, and mechanically ventilated with a tidal volume of 8 ml/kg, a respiratory rate of 110 breaths per minute and an inspired fraction of oxygen ($FiO_2$) of 21%. Mice were placed in a prone position and the head was stabilized using a stereotaxic frame (ASI instruments, Inc., MI). After incision and dissection of the skin, an opening in the skull was performed using a micro-drill (MD-1200, Braintree Scientific, Inc., MA) and a $PO_2$ probe was inserted at the desired location. The coordinates for the thalamic measurements were mediolateral [ML]=−1.00 mm, anteroposterior [AP]=−2.00 mm, and dorsoventral [DV]=−4.00 mm from the bregma, while the coordinates for the vestibular nuclei were ML=−1.25 mm, AP=−6.00 mm, and DV=−3.90 mm from the bregma. For the thalamic measurements a flexible polarographic Clark-type oxygen microprobe was used (LICOX; GMS, Kiel-Mielkendorf, Germany). For the vestibular nuclei measurements an optical $PO_2$ probe was employed (OxyLab, Oxford Optronix, Abingdon, UK). During the brain $PO_2$ measurement the depth of anesthesia was reduced by lowering the Isoflurane concentration to 0.5-1% to minimize the impact of anesthesia on the brain $PO_2$. During measurements mice were ventilated with various gas mixtures according to the experimental group: 21% $O_2$, 11% $O_2$, 600 ppm CO balanced air. In some experiments the $FiO_2$ was modulated over the course of the test and the brain $PO_2$ was simultaneously measured.

Hematocrit and COHb Measurements

Eighty microliters of blood were collected by tail snip into a heparinized capillary. Hemoglobin concentration, hematocrit and the saturation of hemoglobin with oxygen ($O_2Hb$) and carbon monoxide (COHb) were measured using a blood gas analyzer (ABL800 FLEX, Radiometer, Copenhagen, Denmark).

Chambers for Various Chronic Breathing Regimens

Mice were housed in 80-L transparent acrylic boxes. Control chambers were provided with a constant flow of medical air at 21% $FiO_2$. A concentration of 11% or 17% oxygen was obtained by mixing medical air with nitrogen obtained from a nitrogen generator (MAG-20; Higher Peak). A concentration of 600 ppm CO was obtained by mixing medical air with CO from a cylinder containing 2% CO (20,000 ppm) (Airgas). The total gas flow through the chamber was adjusted to maintain chamber $CO_2$ concentrations below 0.4% (CO200; Extech). Soda lime was added to the chambers as a $CO_2$ scavenger. The oxygen concentration was measured at the outlet port of the chamber with an $O_2$ sensor (MiniOx 1; Ohio Medical), which was calibrated using an 8.55% $O_2$ reference tank (Airgas). In a similar way the CO concentration was measured a CO sensor (MSA Altair PRO; MSA Safety Inc, Pittsburgh, Pa), which was calibrated using a 1000 ppm CO reference cylinder (Airgas). Oxygen levels inside the chambers were tolerated within a 0.4% offset from the target concentration by adjusting nitrogen flow as needed. Temperature was maintained at 24-26° C., and humidity was maintained at 30-70%. A standard light-dark cycle of ~12 h light exposure was used. Mice were housed in cages with standard bedding and given unlimited access to food and water.

Anemia

To induce anemia, mice were placed on a low iron diet. Since the time to achieve adequate levels of anemia would have been too long and KO mice would have died of their mitochondrial disease, 150-200 uL of blood were collected every other day until hemoglobin concentration reached the desired values. Within 2 weeks, hemoglobin concentrations reached approximately 3-4 g/dL and remained stable while the mice remained on a low iron diet.

MRI

MRI scans of the brain were performed as previously described (Ferrari et al., 2017), using respiratory gated T2-weighted RARE (rapid acquisition of refocused echoes) MRI images acquired on a 4.7-T small animal scanner (Pharmascan; Bruker) with the following parameters: RARE factor: 10, echo time: 60 ms, repetition time: 6000 ms, Averages: 8, 192×192×24 image matrix with a voxel size of 0.130×0.130×0.7 mm. Mice were under anesthesia (isoflurane between 0.5-1.5% in room air) during the imaging procedure. Images were generated using a DICOM reader (Osirix, University of Geneva).

qPCR

Animals were sacrificed by CO2 asphyxiation followed by cervical dislocation. Individual cerebella were immediately harvested and snap frozen in liquid N2. The tissue was then disrupted with two 5 mm stainless steel beads (QIAGEN) using a Qiagen TissueLyser for 2 mins at 25 Hz. RNA was extracted with the RNeasy Lipid Tissue Mini Kit (QIAGEN), before murine leukemia virus (MLV) reverse transcription using random primers (Promega). qPCR was performed using the TaqMan technology (Life Technologies), using the following probes:

| | |
|---|---|
| Mm00833882_m1 | (EPOR) |
| Mm00437306_m1 | (VEGFA) |
| Mm01612132_m1 | (LDHA) |
| Mm00441480_m1 | (SLC2A1) |
| Mm01202755_m1 | (EPO) |
| Mm00437762_m1 | (B2M) |

All data were normalized to B2M (Mm00437762_m1).

Quantification and Statistical Analysis

Analyses were performed using GraphPad Prism 7.0 software. The two-sample Student t-test was used for two-group comparisons. Unless otherwise indicated, one-way ANOVA with Bonferroni's correction was used for multiple comparisons. The log-rank test was performed, and HRs with 95% CIs were calculated to compare survival rates. A P value<0.05 was considered to indicate statistical significance. Data are reported as mean±SD.

Example 1. Activation of the Hypoxia Response Pathway is not Sufficient to Rescue Disease We had originally performed a genome-wide CRISPR screen and identified activation of the hypoxia transcriptional response as being protective in cell culture models of mitochondrial disease. However, we never tested whether activation of this pathway is sufficient to rescue the Ndufs4 KO mouse model. A major component of the cellular and organismal hypoxia response is mediated by the hypoxia-inducible transcription factors (HIFs). In well-oxygenated environments, the prolyl hydroxylase enzymes (PHDs) use molecular oxygen as a substrate and hydroxylate the HIF transcription factors (Wang et al., 1995; Majmundar et al., 2010; Ivan et al., 2001). It is this hydroxylated form that is recognized by the E3-ligase, von Hippel Lindau (vHL) factor and targeted for proteasomal degradation. There are three known PHD enzymes involved in oxygen sensing, PHD1-3. PHD2 inhibition is typically associated with HIF activation. However, PHD1 and PHD3 have also been reported to have redundant roles in signaling to the HIF transcriptional program. There are also two isoforms of HIF-HIF1α and HIF2α. While these transcription factors have partially overlapping roles, HIF1α is thought to primarily regulate cellular hypoxia adaptations (e.g. increasing glycolysis, modifications of the tricarboxylic acid cycle (TCA) cycle, etc.) (Majmundar et al., 2010). HIF2α is more relevant for whole-body physiological adaptations such as erythropoiesis and angiogenesis. In mouse models, genetic disruption of the PHD enzymes or vHL activate the hypoxia transcriptional program and have been previously utilized to explore the therapeutic potential of targeting this pathway in a range of conditions, including stroke and hindlimb ischemia (Quaegebeur et al., 2016). Here, we used the same genetic models to assess whether activating the HIF transcriptional program is sufficient to rescue neurological disease in the Ndufs4 KO mouse model.

Figure 1B:
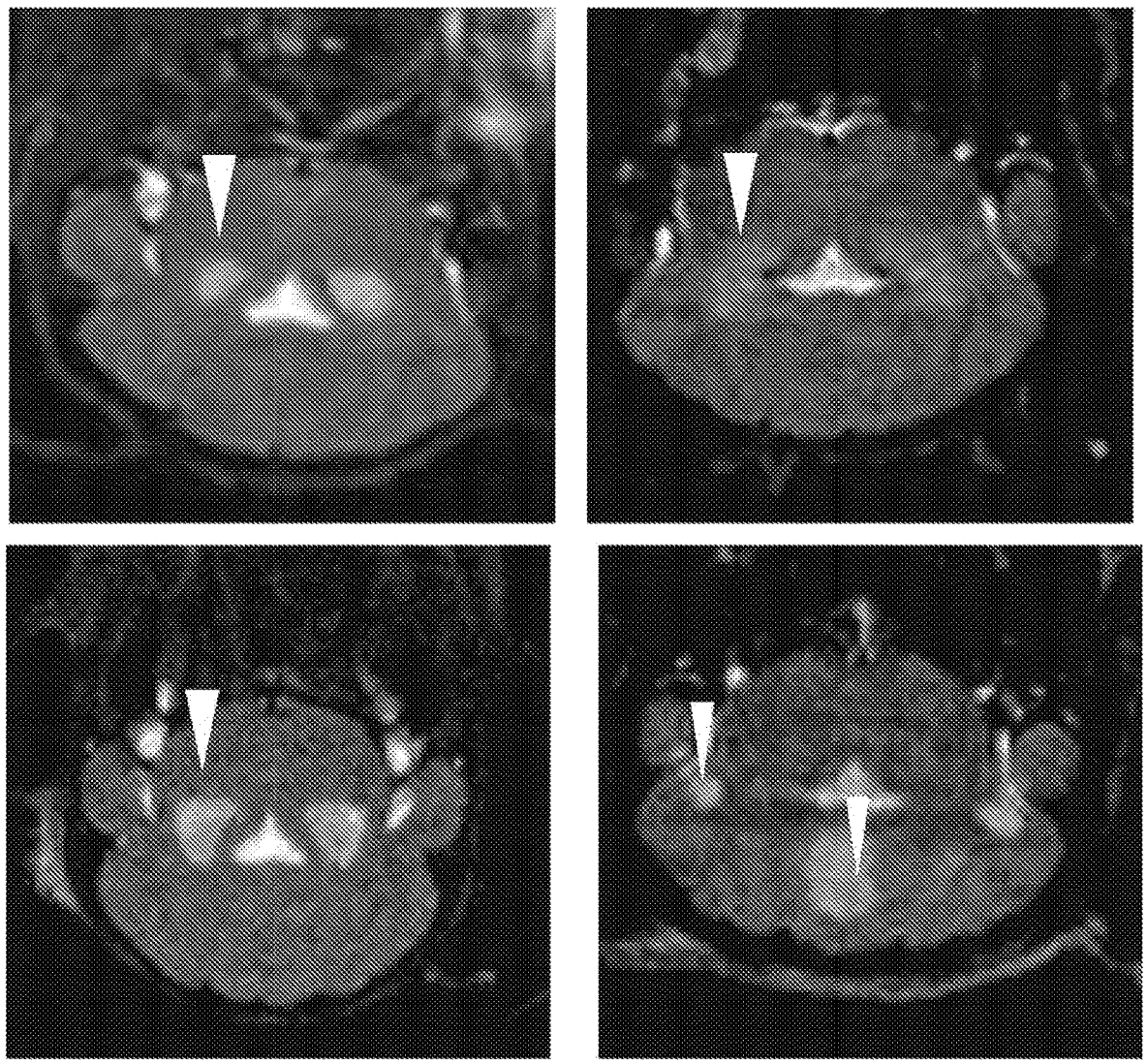
Figure 1C:
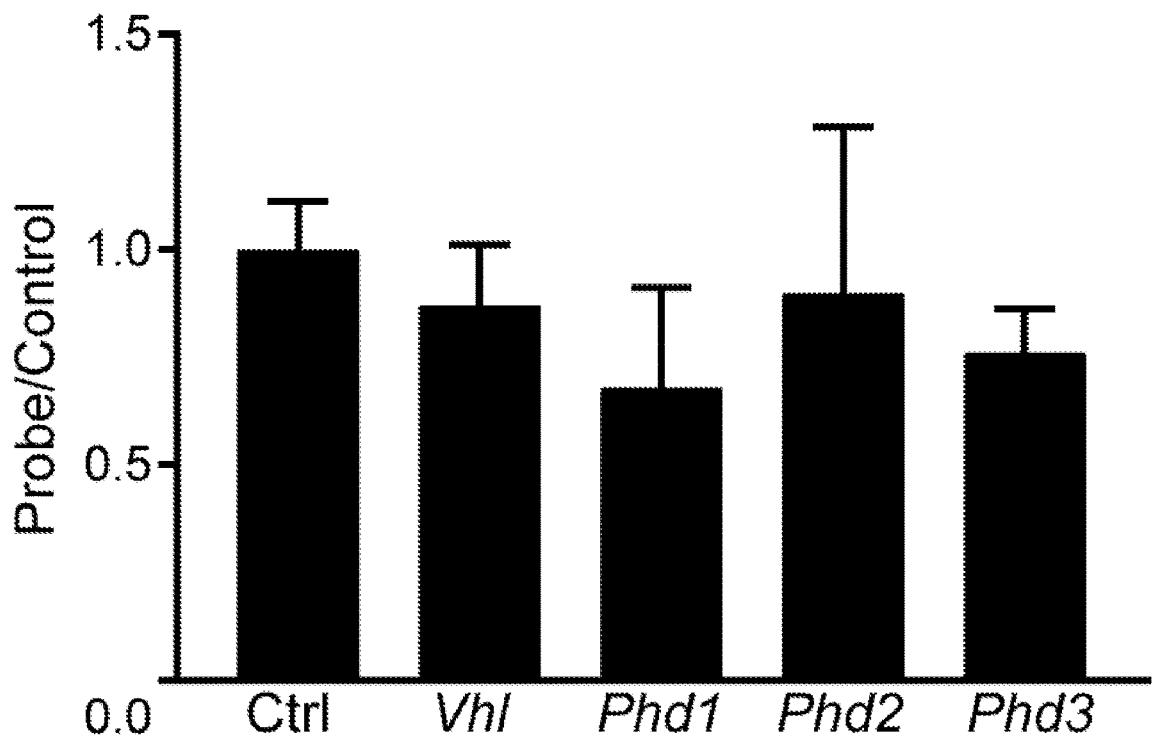
Figure 1C:
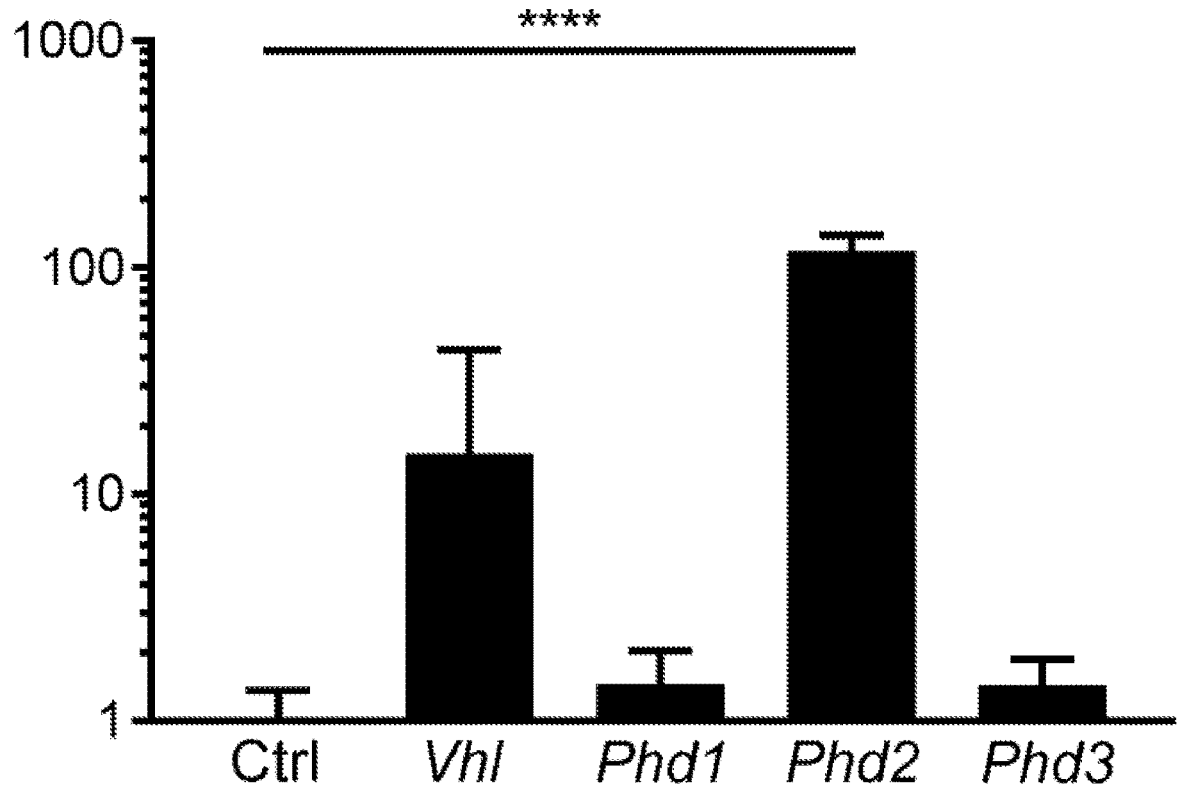
Figure 1D:
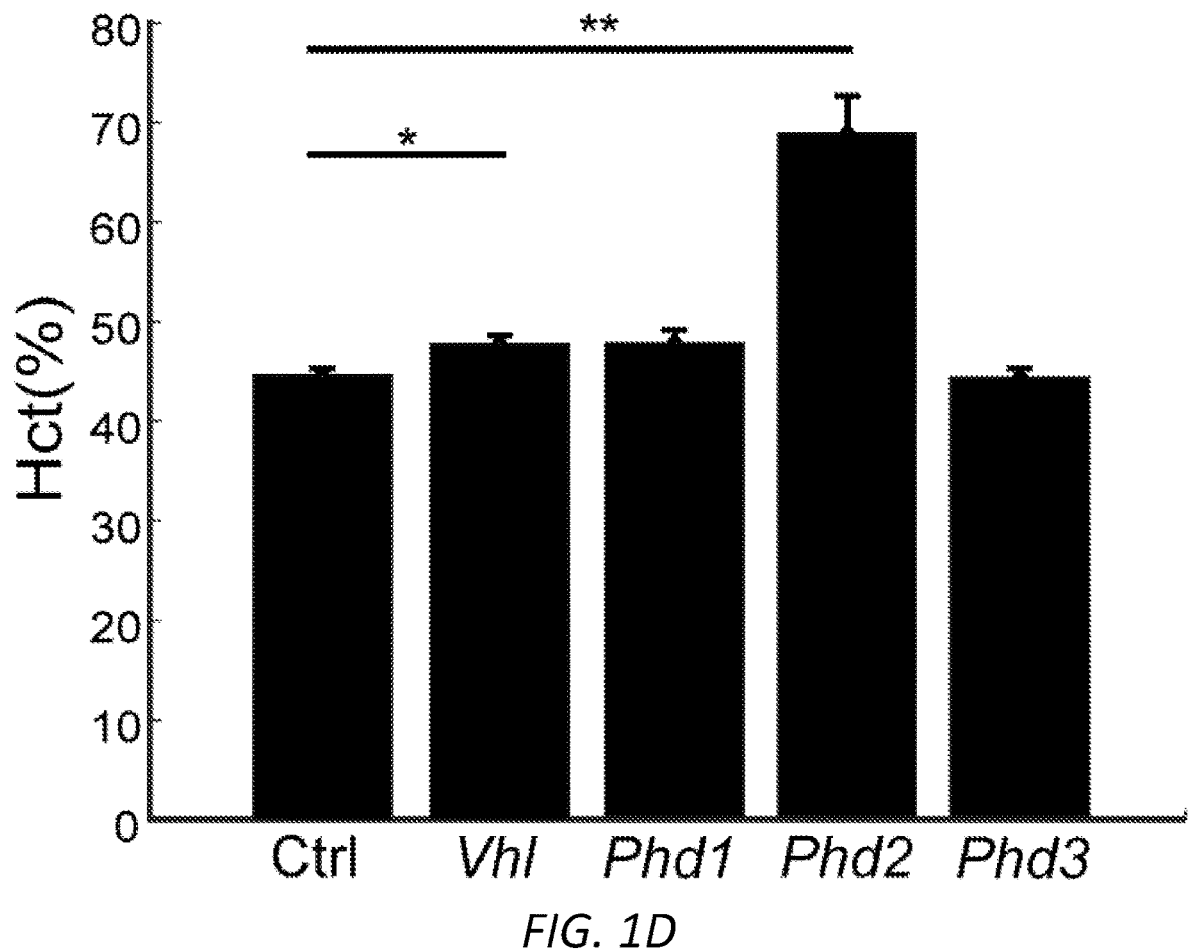

We crossed the Ndufs4 KO strain with mice lacking Phd1, Nestin-Phd2, Phd3 or the Chuvash mouse harboring a point mutation in Vh1 ($Vh1^{ch/ch}$) (Quaegebeur et al., 2016; Hickey et al., 2007). We asked whether the hypoxia response was indeed activated in the different genetic models of the hypoxia transcriptional program. The Phd2 strain consistently showed elevation of canonical HIF targets in the cerebellum, where disease pathology eventually appears (FIG. 1C). For example, Epo expression was 100× increased in this strain. Moreover, Ldha and Vegfa transcripts were similarly elevated in Phd1, Phd2 and Vh1 mice. Phd3 mice did not show a canonical HIF response in the cerebellum. These findings are consistent with previous reports that Phd2 and vHL are more direct mediators of the HIF response. Furthermore, HIF2α activation results in elevated hematocrit levels. In our hands, only Nestin-Phd2 mice had an elevated hematocrit (>60%, FIG. 1D).

Notably, none of these genetic crosses were sufficient to prevent disease. Overall survival of double KOs was equivalent or even worse than $Ndufs4^{-/-}$ mice (Het or WT for Phd/Vh1 genes) (FIG. 1A). Specifically, Ndufs4 KO mice that were lacking Phd1 had a median survival of 45 d vs. control Ndufs4 KO mice with a median survival of 57 d (matched for genetic background). Even more strikingly, $Ndufs4^{-/-}$; $Nestin-Phd2^{-/-}$ had a median survival of 29 d vs. matched Ndufs4 KO controls which had a median survival of 64 d. $Ndufs4^{-/-}$; $Phd3^{-/-}$ survived for a median of 69 d vs. matched $Ndufs4^{-/-}$ with median survival of 61 d. Finally, $Ndufs4^{-/-}$; $Vh1^{ch/ch}$ lived to 48 d vs. 69 d for matched $Ndufs4^{-/-}$ mice. Notably, loss of Phd2 or Vh1 robustly led to HIF activation, and these same strains were particularly sensitive to complex I deficiency. Moreover, all four genetic crosses resulted in double KOs that developed lesions in the vestibular nucleus (and additional cerebellar lesions in the Vh1 cross) as imaged by T2-weighted MRI (FIG. 1B). These genetic crosses indicate that artificially activating the HIF response is insufficient to rescue disease. Thus, small molecule inhibitors of the PHD enzymes or vHL enzyme are predicted to be ineffective in vivo, and in fact, could be toxic, in the context of a whole organism with complex I deficiency and Leigh syndrome.

Figure 2A:
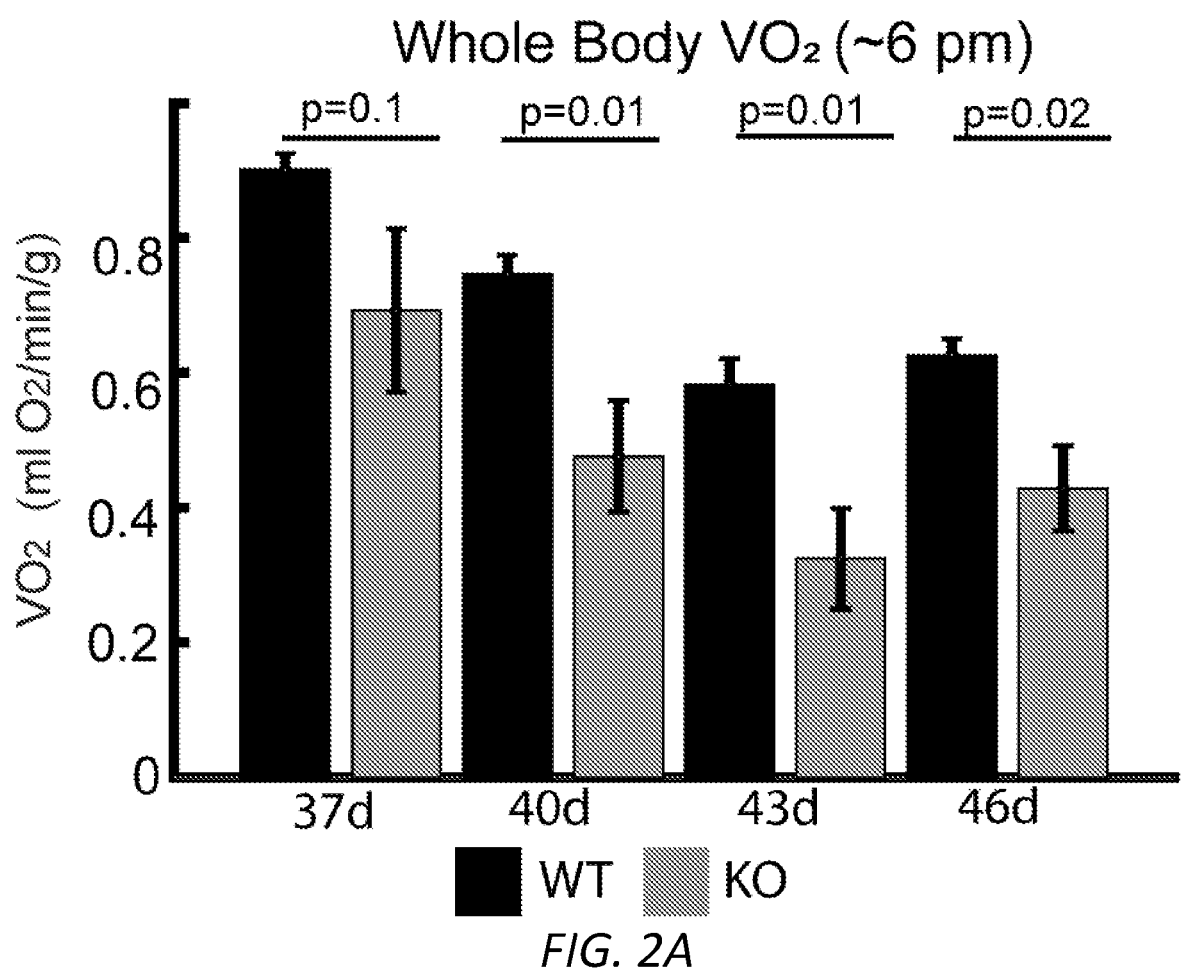
FIGS. 2A-F. Whole body and brain oxygenation of KO and WT mice. Whole-body oxygen consumption (normalized for body weight) during (A) active hours or (B) inactive hours. Data smoothened over 70 collection points (~5.5 h). Values normalized to body weight at each collection point. n=6 per group. Unpaired t-test p-value shown for each genotype comparison at each day. (C) Tissue $PO_2$ measured stereotaxically in hypothalamus of WT and KO mice as a function of age using a Clark electrode (young=36-41 d, old 50-54 d). n=6 for WT, n=5 for young KO and n=5 for old KO. Dotted line represents $PO_2$ of WT mice breathing room air. Unpaired t-test p-value shown for comparison of KOs to WT breathing room air. (D) Tissue $PO_2$ measurement using an optical $PO_2$ probe stereotaxically placed near vestibular nuclei of WT and KO mice breathing varying oxygen tensions (n=4-6 per group). Dotted line represents $PO_2$ of WT mice breathing room air. (E) Hydrogen peroxide released during complex I (CI)-mediated respiration by isolated mitochondria from WT and KO brains as a function of dissolved oxygen. (F) Median survival of KO mice as a function of inhaled oxygen, using data from this paper and from previously published studies (Ferrari et al., 2017; Jain et al., 2016).
Figure 2B:
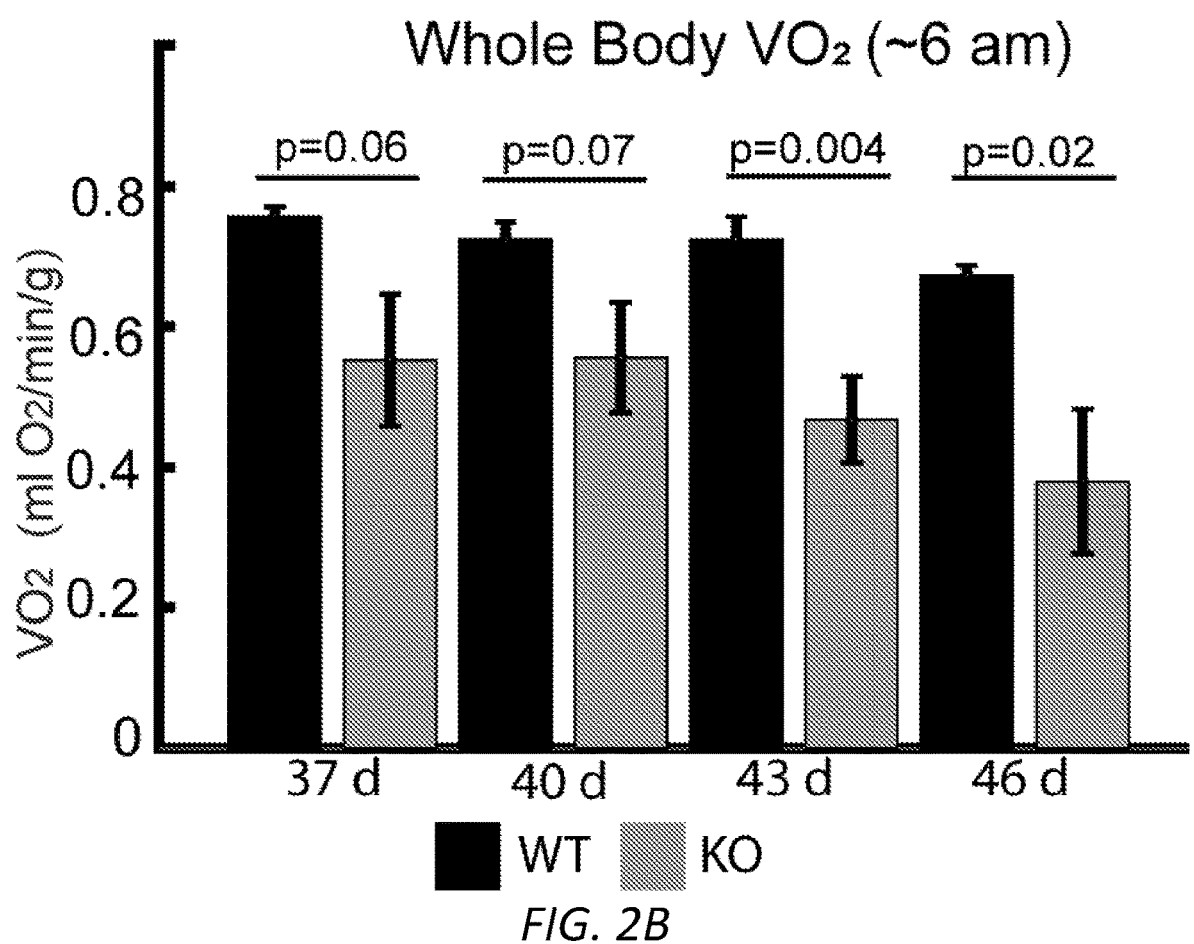

Example 2. Impaired Whole-Body Oxygen Consumption and Brain Hyperoxia in Ndufs4 KO Mice Mitochondria consume 90% of the oxygen in the body (Rich et al., 2003). Thus, it is possible that genetic defects in the electron transport chain will have a secondary impact on tissue oxygenation. In fact, venous hyperoxia has been documented in patients with mitochondrial disease and has also been proposed to be a diagnostic test in patients with mitochondrial myopathy (Taivassalo et al., 2002). We monitored whole body and cerebral oxygenation in WT and Ndufs4 KO animals. We continuously measured whole body oxygen consumption in WT and KO animals, as a function of age. At ~37 d of age, whole body oxygen consumption (normalized for total body weight) was not significantly different between KO and WT animals. However, in awake mice this parameter decreased in KO animals as a function of age, reaching nearly half the value of WT animals at ~45 d of age (FIG. 2A). Thus, it appears that the decline in whole body oxygen consumption correlates with the overt disease phenotype until death at ~60 d of age. This difference is observed during both active and inactive periods of the murine day (FIG. 2B).

Figure 2C:
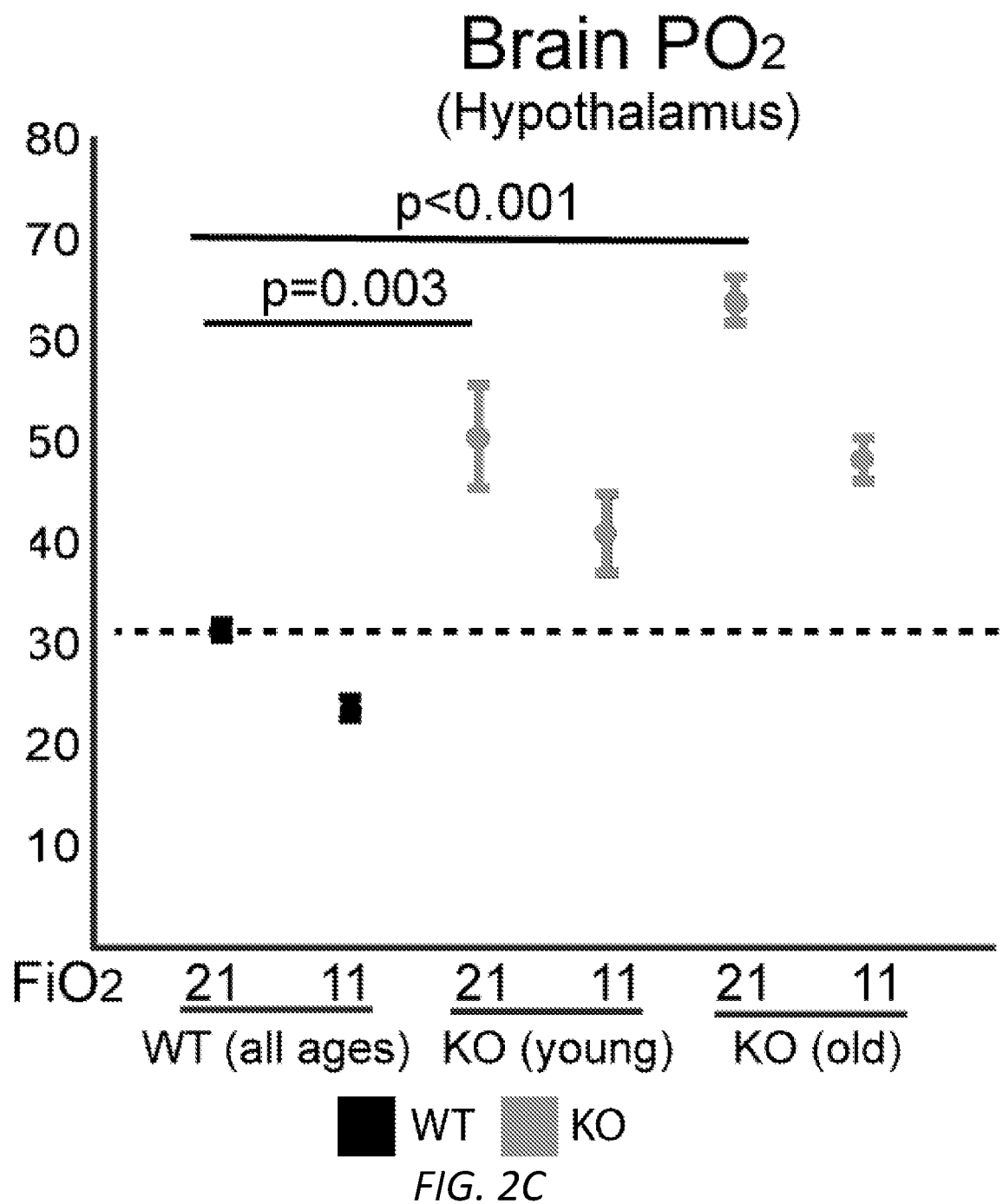
Figure 2D:
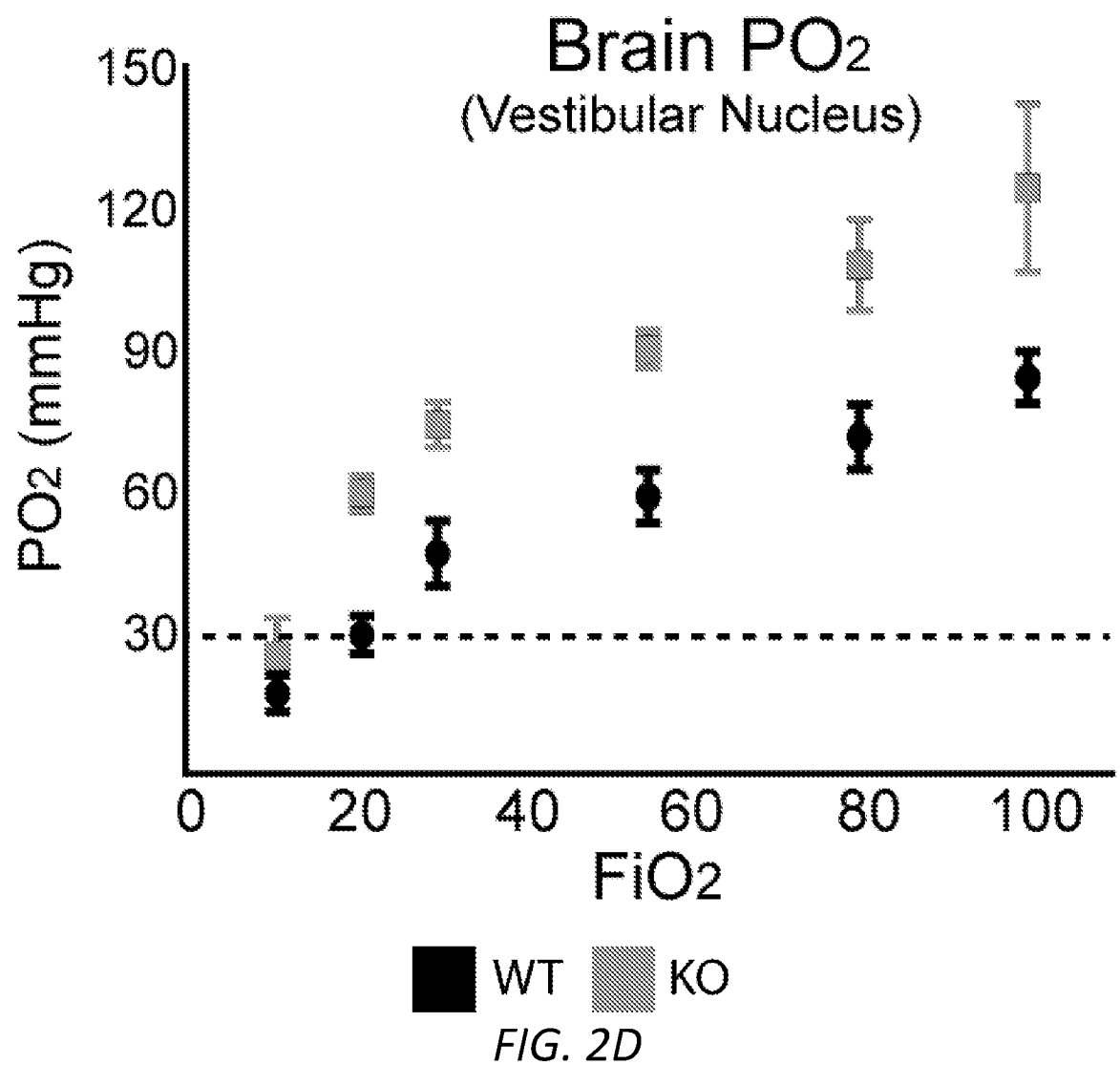

We reasoned that such overt defects in oxygen consumption might affect brain tissue $PO_2$. We used two different types of probes for measuring the partial pressure of oxygen in the brain—an amperometric Clark electrode, and an optical probe whose phosphorescence is sensitive to oxygen levels (see Methods). Using a Clarke electrode, we stereotaxically monitored cerebral $PO_2$ in the hypothalamus (as a representative brain region that was easily accessible) of anesthetized KO and WT mice as a function of age (FIG. 2C). In 30-day-old KO mice, the partial pressure of oxygen ($PO_2$) in brain tissue was significantly higher than in WT mice (51 vs 31 mmHg, p=0.003). Remarkably, KO mice showed an age-dependent increase in brain tissue $PO_2$, reaching 64 mmHg at 40-50 d of age (p<0.001 vs. WT mice and p=0.04 vs. 30-day-old KO mice). Once again, age-dependent changes in brain tissue $PO_2$ appear to correlate with the disease severity in KO mice. We then asked how breathing various oxygen concentrations translated into changes in brain $PO_2$. We monitored brain $PO_2$ in the vestibular nuclei of anesthetized KO and WT mice while $FiO_2$ was increased from 11 to 100%. These measurements were made using an optical probe. For any given $FiO_2$, brain $PO_2$ was significantly higher in late-stage KO mice vs age-matched WT mice. Indeed, 11% $FiO_2$ in KO mice resulted in an equivalent brain $PO_2$ as 21% $FiO_2$ in WT mice (FIG. 2D).

Figure 2E:
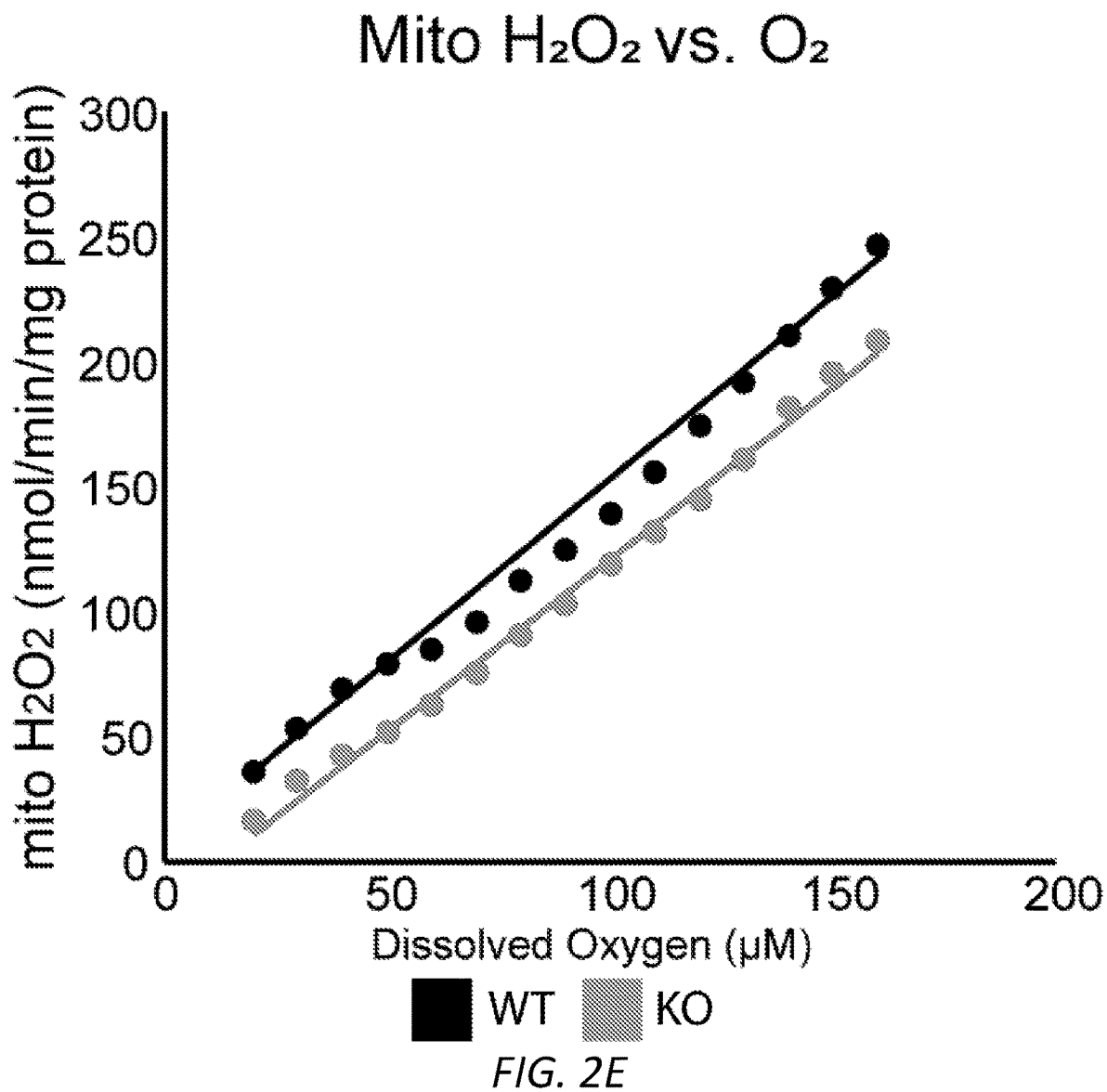
Figure 2F:
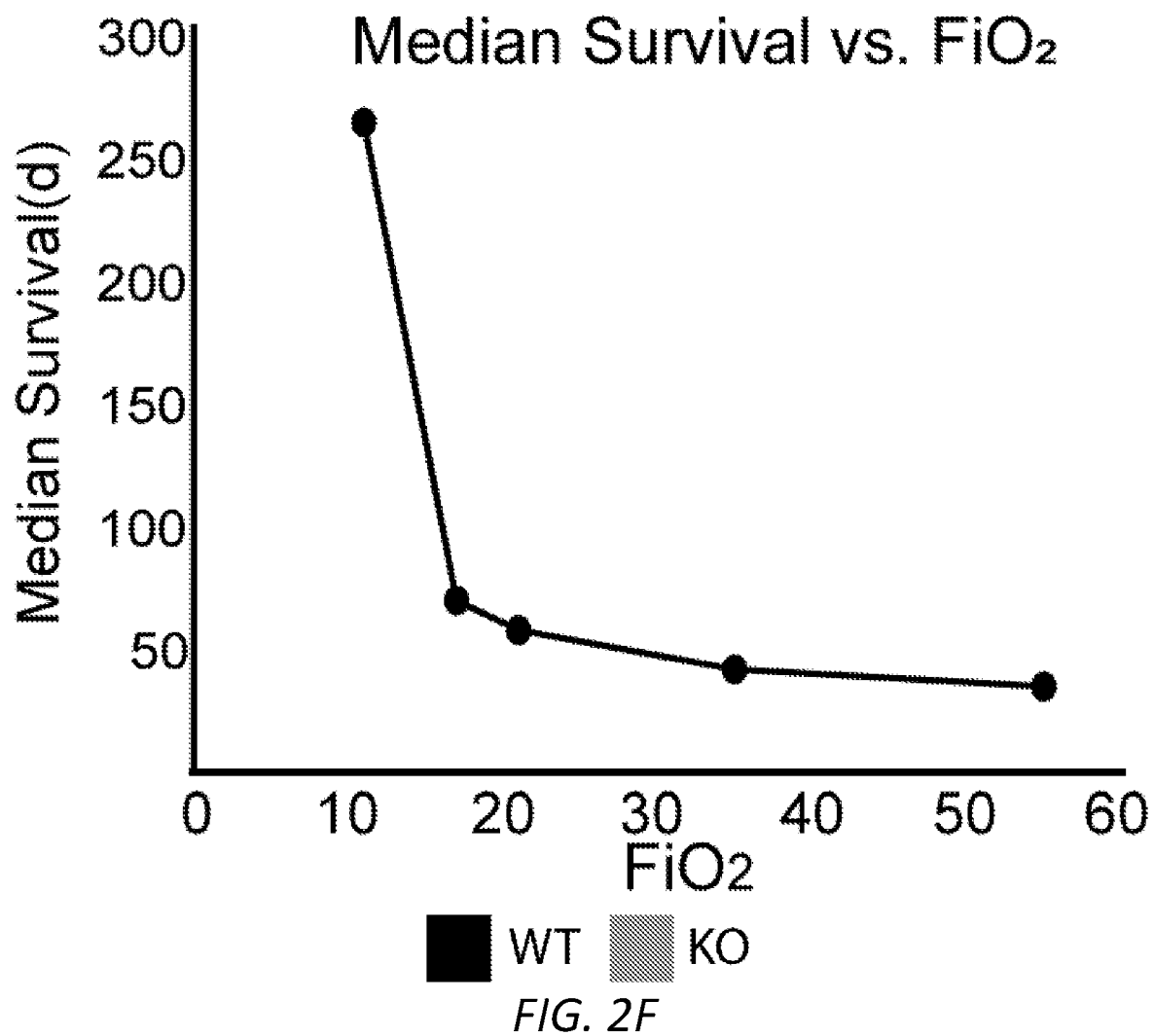

We determined the dose-response relationship between $FiO_2$ and survival of Ndufs4 KO mice. Combining previously published data (Ferrari et al., 2017) with newly-generated survival curves, we show a remarkable drop-off in survival at 11-13% $FiO_2$ (FIG. 2F). Survival between 17% and 55% $FiO_2$ also shows a clear worsening in the disease state. Therefore, it is likely that localized and age-dependent changes in brain $PO_2$ result in tissue hyperoxia, which directly causes brain tissue damage.

Previous studies have demonstrated a strong dependence of isolated mitochondrial superoxide production on local $O_2$ concentrations (Kussmaul et al., 2016; Stepanova et al., 2019). We asked whether this relationship varied between KO and WT tissue. We collected forebrain/midbrain tissue from ~60-d-old mice from each genotype, isolated mitochondria and assessed hydrogen peroxide production as a function of local oxygen tension. We modulated oxygen concentration in the medium with respiring mitochondria while simultaneously measuring the resulting $H_2O_2$ production. Using malate and pyruvate as a substrate combination for complex I, we find that this relationship is comparable in KO and WT mice (FIG. 2E). Therefore, for a given oxygen tension, mitochondria from both genotypes produce an equivalent amount of $H_2O_2$. In principle, the increased brain $PO_2$ observed in KO mice is predicted to provide a higher rate of ROS production at a fixed $FiO_2$.

Collectively, these findings suggest that impaired complex I activity in aged KO mice results in relative tissue hyperoxia, presumably due to a mismatch between oxygen delivery and its utilization. Future work is needed to understand how this elevated oxygen pressure results in the observed neuroinflammatory signature and neuronal cell death.

Example 3. Chronic Hypoxia Normalizes Brain $PO_2$ in Ndusf4 KO Mice

In the context of acute hypoxia exposure, we observed a decrease in brain $PO_2$ in both WT and KO mice (FIG. 2C). We asked whether a similar effect would be observed in mice chronically exposed to 11% oxygen. During chronic hypoxia a compensatory increase in Hb concentration and ventilation may preserve oxygen delivery to the brain with no change in brain $PO_2$. We exposed both WT and KO mice to 11% $O_2$ and we measured brain $PO_2$ after three weeks. All hypoxic mice had a lower brain $PO_2$ as compared to mice breathing 21% $O_2$ with the same genotype (17 mmHg vs. 30 mmHg, p=0.0007 in WT and 29 vs. 64 mmHg, p<0.0001 in KO, FIG. 2D). As we observed in the acute setting, chronic 11% $O_2$ exposure in KO mice resulted in a brain $PO_2$ similar to WT mice breathing air. These results show that chronic hypoxic breathing normalizes the brain $PO_2$ of Ndusf4 KO mice despite an increase in the circulating Hb level (Jain et al., 2016).

Example 4. CO Decreases Oxygen Content, Normalizes Brain Tissue $PO_2$ and Rescues Brain Disease If brain $PO_2$ is a key parameter dictating neurological disease progression in the mouse model of Leigh syndrome, other interventions that lower brain $PO_2$ should similarly rescue neurodegenerative disease. Hypoxia breathing reduces arterial oxygen content by lowering both arterial oxygen saturation and the partial pressure of arterial oxygen ($PaO_2$). A well-known mode of altering tissue oxygenation is exposure to carbon monoxide (Blumenthal 2001). Carbon monoxide binds to hemoglobin with a 200-fold increased affinity relative to oxygen, outcompeting the binding pocket for oxygen. In doing so, CO displaces oxygen from hemoglobin, forming carboxyhemoglobin (COHb) and lowering arterial oxygen saturation ($O_2Hb$). CO also increases the affinity of hemoglobin for oxygen, reducing the off-loading of bound oxygen to the tissues. We decided to test whether breathing a high but sublethal concentration of CO in 21% $O_2$ could rescue neurological disease in Ndufs4 KO mice.

Figure 3A:
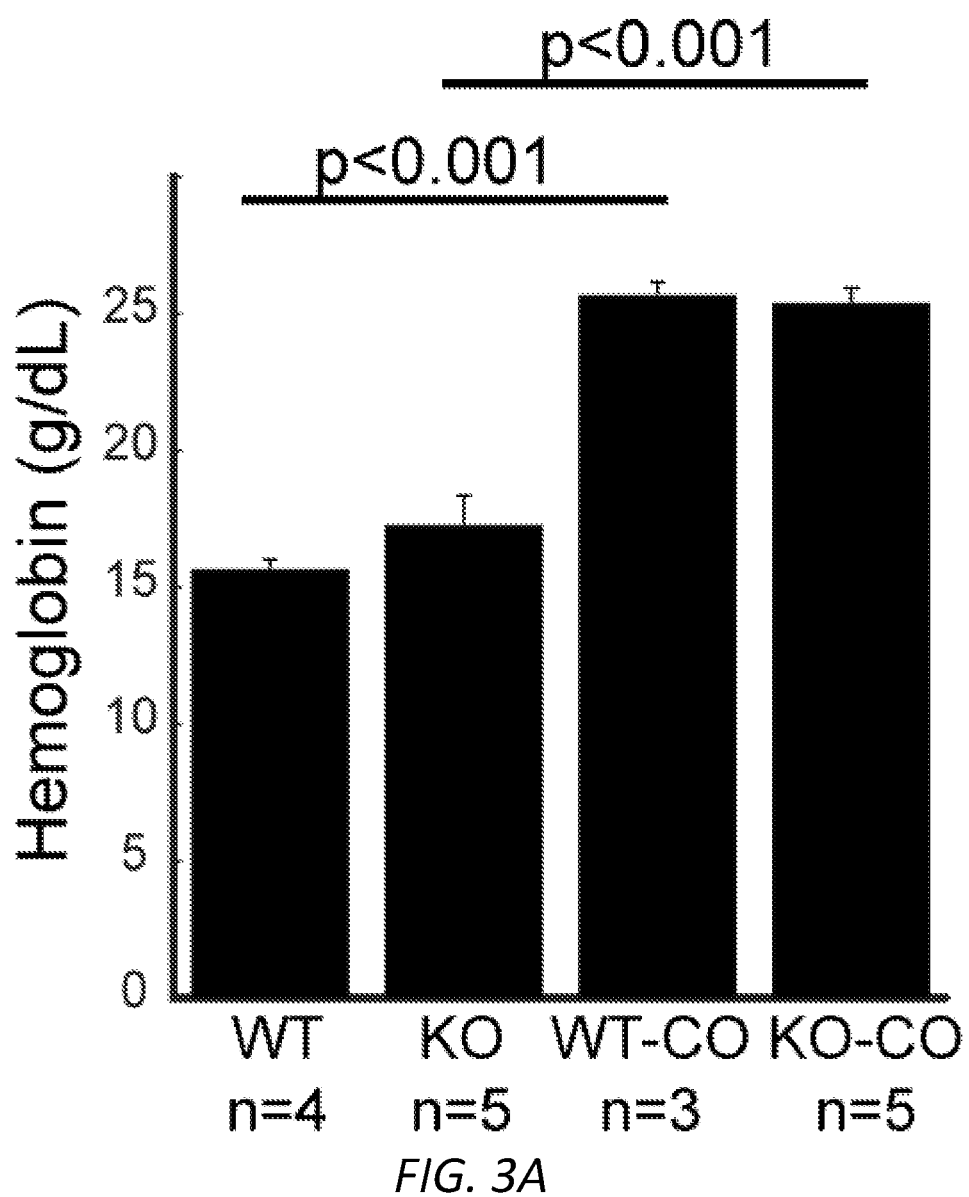
FIGS. 3A-H. Breathing carbon monoxide reduces brain hyperoxia and reverses disease in Ndufs4 KO mice. (A) Hemoglobin and (B) Hematocrit of WT and KO mice exposed to air or ~600 ppm carbon monoxide in air for ~3 weeks. Unpaired t-test p-value shown within inserts. (C) Percentage of carboxyhemoglobin of WT mice breathing 11% $F_iO_2$ vs. 600 ppm CO. (D) Body weight trajectory of mice exposed to preventative (darker gray) hypoxia therapy, late-stage hypoxia therapy (black) or late-stage carbon monoxide therapy (lighter gray). (n=8 for KO prevention in gray, n=8 for KO disease reversal with hypoxia breathing in black, n=6 for KO disease reversal with CO breathing). Note: hypoxia body weight curves taken from historical data previously reported in (Ferrari et al., 2017) and adapted for this figure. (E) Survival of mice breathing room air (historical data from (Ferrari et al., 2017) vs. 600 ppm CO in room air. Log-rank p-value shown within insert. n=12 for CO survival in gray, n=14 for mice breathing room air in black. (F) Reversal of T2-weighted MRI lesions in mice exposed to 600 ppm CO starting a late stage of disease. Pre-treatment scans on left, post-treatment of same mice after 2-3 weeks of CO on right. Three rows are three individual mice (G) Brain (vestibular nucleus) $PO_2$ of WT and KO mice breathing 21% $F_iO_2$, 11% $F_iO_2$ or 600 ppm CO in 21% $O_2$. (data for WT taken from same data as FIG. 2) (H) T2-weighted MRI scan sections through late-stage KO mouse breathing room air vs. lesions observed in KO mouse chronically exposed to 600 ppm CO. From left to right in 3H, lesions correspond to Top 1 (vestibular nucleus), Bottom 2 (red nucleus), Bottom 4 (caudoputamen) and Top 5 (olfactory bulb). Typical disease lesion in vestibular nucleus shown with arrow in the top left panel. New lesions in CO-treated KO mice shown with arrows in the bottom row.
Figure 3B:
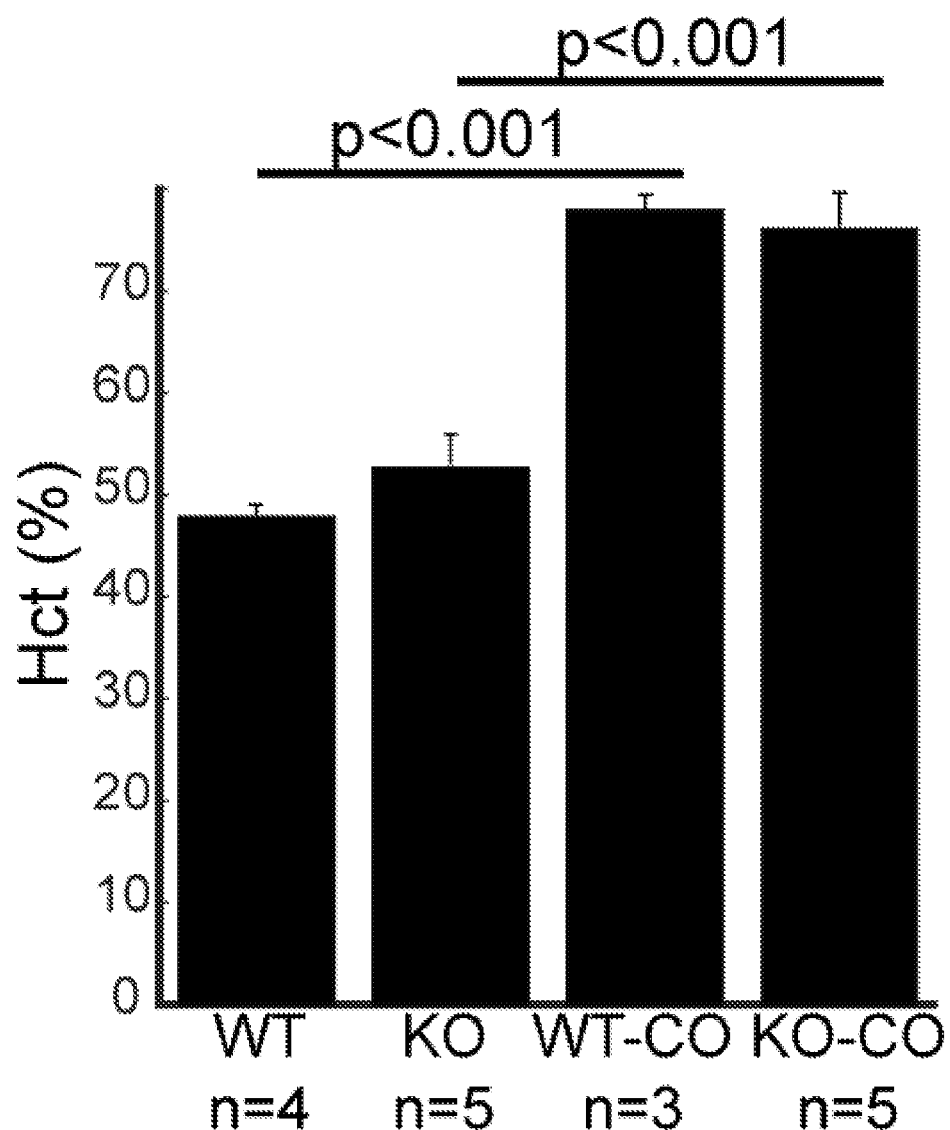
Figure 3C:
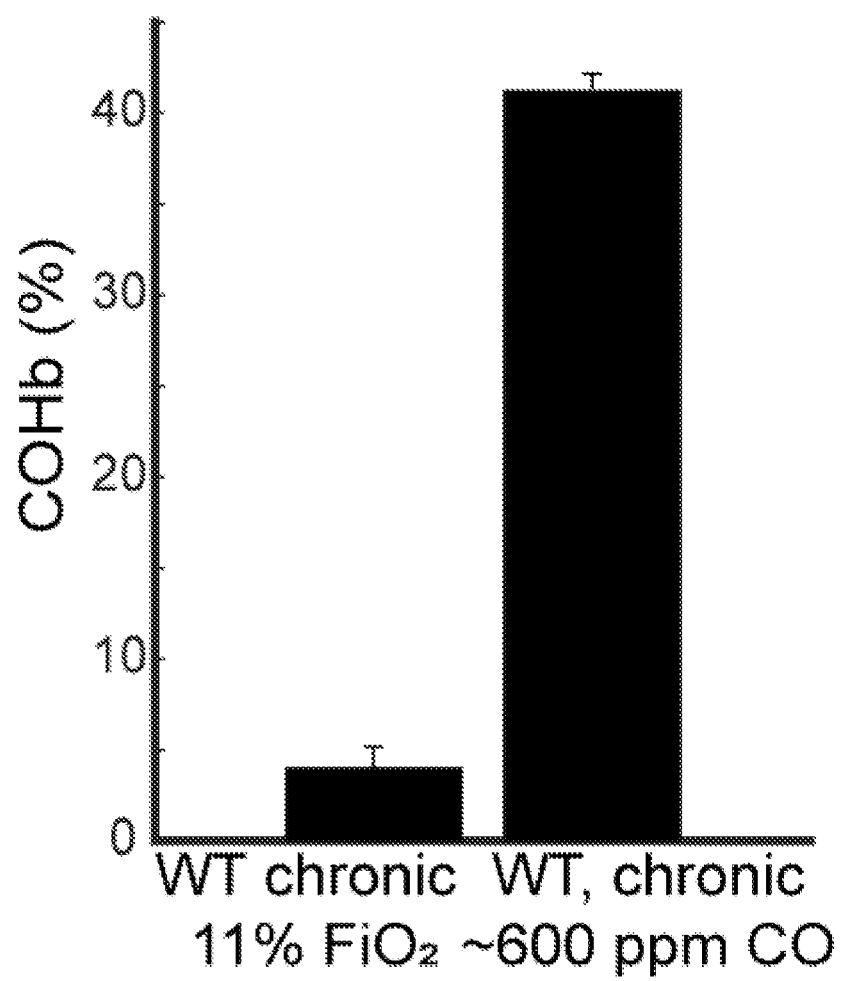
Figure 3D:
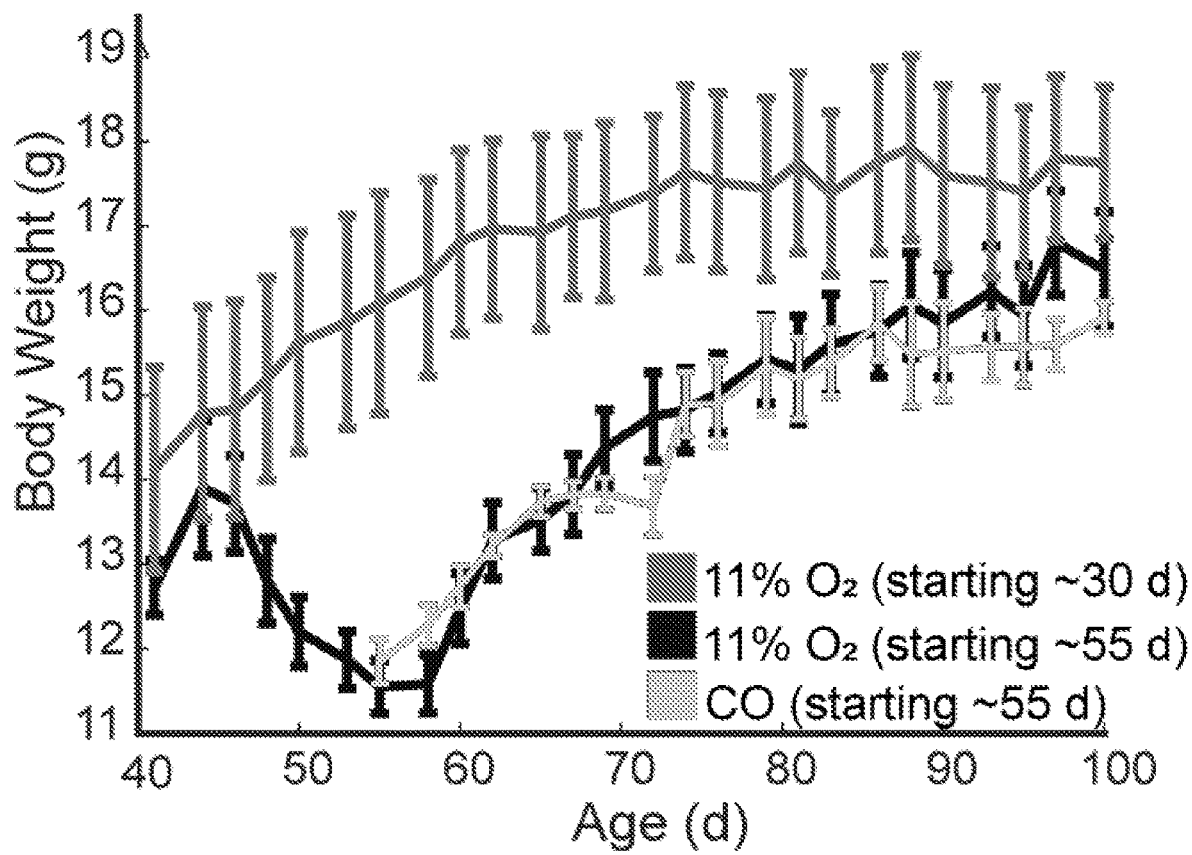
Figure 3E:
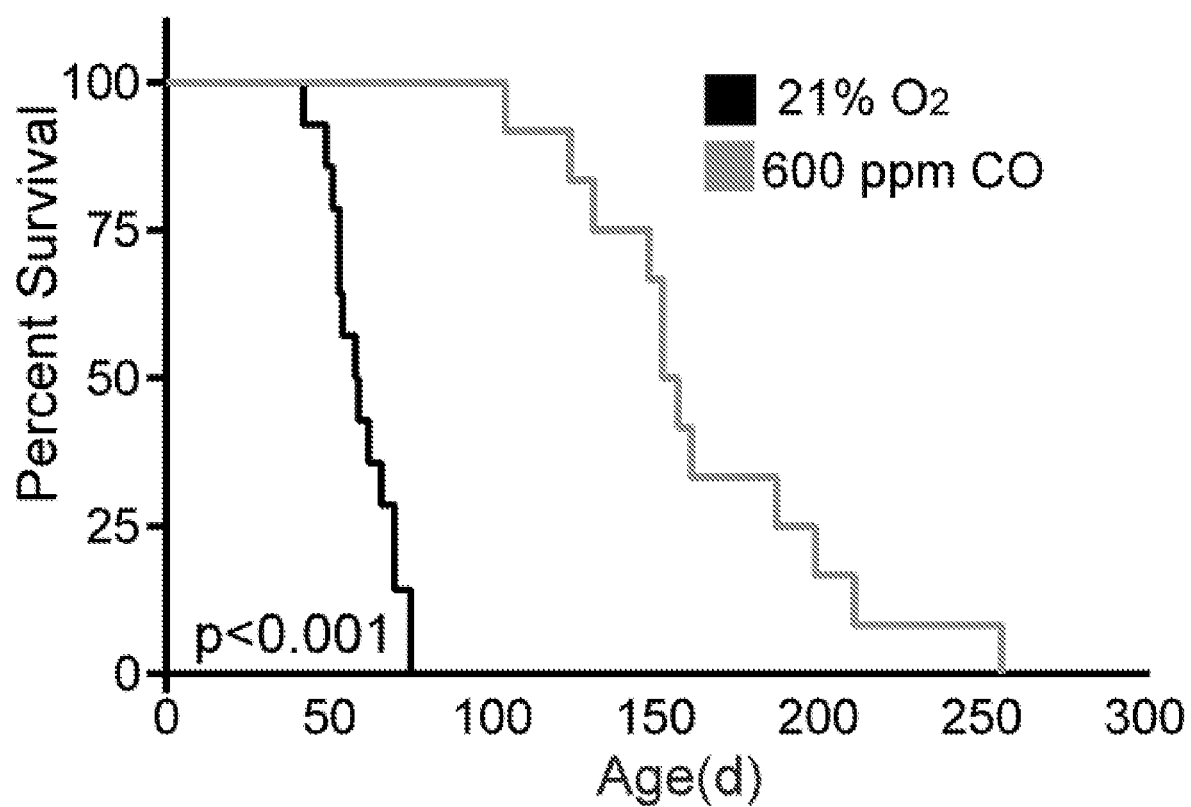
Figure 3F:
Figure 3F:
Figure 3F:
Figure 3F:
Figure 3F:
Figure 3F:
Figure 3G:
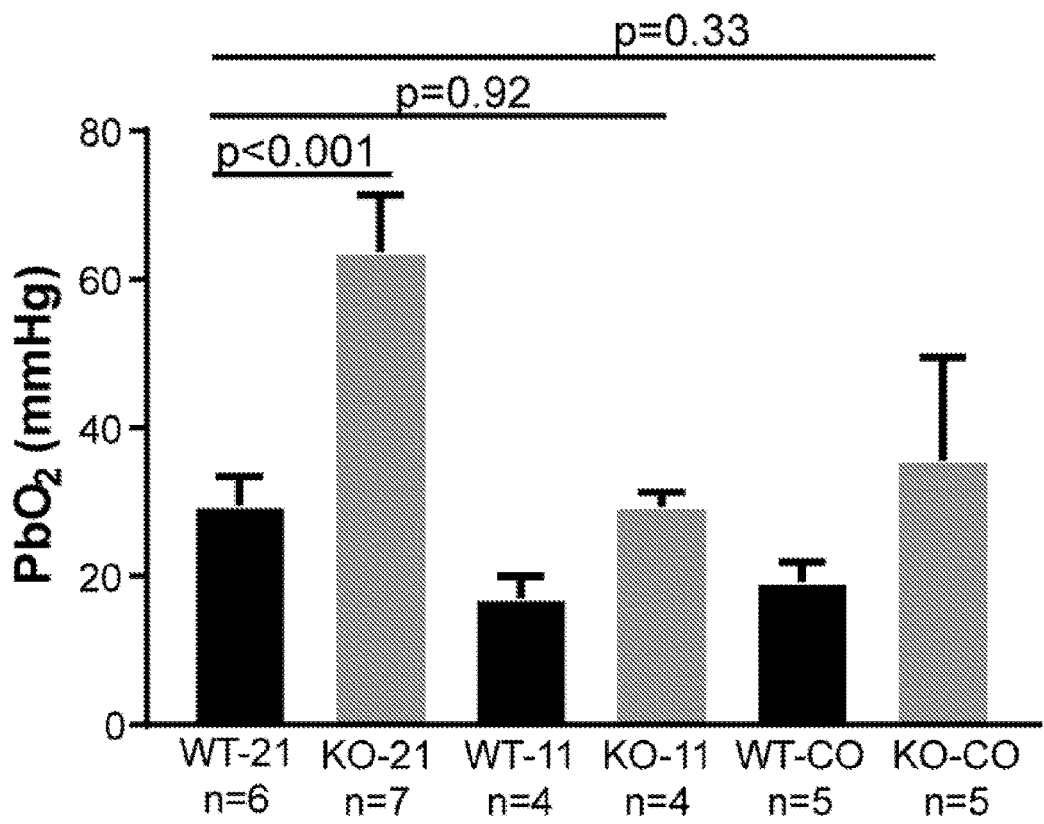

Exposure to chronic, continuous 600 ppm CO in air resulted in ~40% arterial COHb and ~60% arterial $O_2$Hb (FIG. 3C). Of note, breathing 11% $O_2$ results in a similar arterial $O_2$Hb saturation of 55-60%. After three weeks of CO treatment hematocrit showed a marked increase from 48% to 79% in WT and from 53% to 76% in KO mice, suggesting this dose was sufficient to cause renal hypoxia and erythropoietin production (FIG. 3A-B). CO treatment was started in KO mice at a late-stage of brain disease, after body weight loss had already occurred and MRI lesions were apparent. Upon commencing 600 ppm CO treatment, body weight gradually regained, similar to the trend observed during chronic inhaled hypoxia treatment in previous experiments (FIG. 3D) (Ferrari et al., 2017). Moreover, survival was substantially prolonged in KO mice with CO treatment, with a median survival of ~150 d (FIG. 3E). We additionally performed MRI in late-stage mice before and after treatment with CO. Remarkably, CO treatment for 2-3 weeks completely reversed lesions in the vestibular nucleus (FIG. 3F).

Since chronic 11% $O_2$ breathing normalized the relative brain hyperoxia observed in KO mice breathing room air, we asked whether CO treatment similarly acted by reducing brain tissue $PO_2$. Both WT and KO mice chronically breathing CO at 600 ppm in air had a lower brain $PO_2$ as compared to WT and KO mice breathing air (19 vs. 30 mmHg, p=0.0008 in WT and 36 vs. 64 mmHg, p=0.001 in KO, FIG. 3G), based on measurements using an optical probe. The results show that chronic administration of CO at 600 ppm reduces brain $PO_2$, improves survival and reverses brain disease in Ndufs4 KO mice.

Figure 3H:
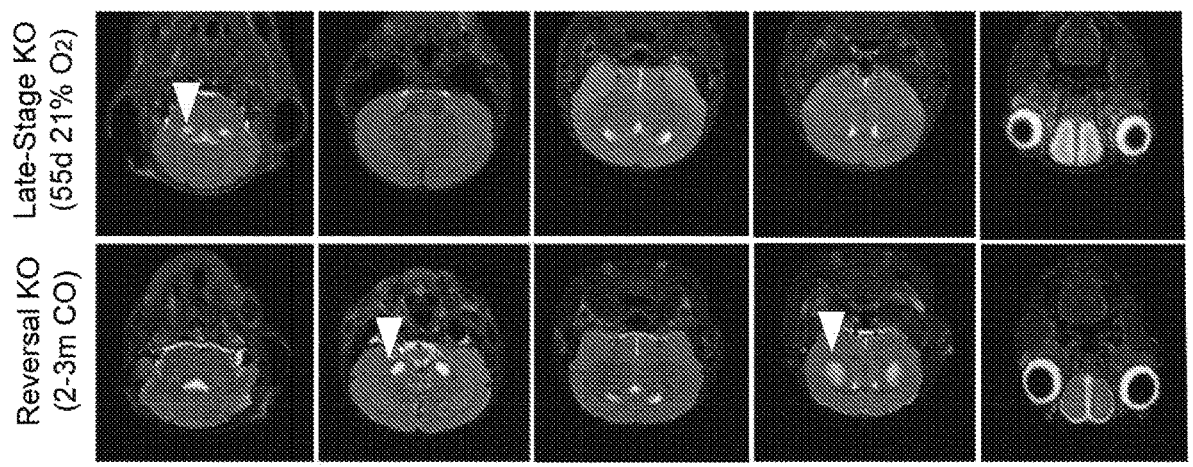

Of course, CO presents a significant health hazard and high doses can result in death or permanent neurological dysfunction (Blumenthal 2001). We asked whether KO mice that were exposed to chronic low-dose CO were able to chronically maintain healthy brain tissue, both in the regions affected by CI deficiency and more generally. We scanned KO mice that had been exposed to CO for 2-3 months. While the Leigh's disease lesions were not present, these mice did develop hyperintense lesions apparent in the caudoputamen region of the brain, presumably due to chronic CO treatment (FIG. 3H). Lesions that are present in humans that have suffered from CO poisoning can be found in different anatomical structures, such as the globus pallidus. However, this pattern is not completely stereotyped and can vary between individuals or states of poisoning (Jeon et al., 2018; O'Donnell et al., 2000). Although inhaled CO is unlikely to be utilized clinically as a therapeutic strategy given its remarkably narrow therapeutic index, these data (FIG. 3) provide valuable proof of concept that reducing brain oxygen delivery alleviates the progression of Leigh disease in this mouse model.

Example 5. Severe Anemia can Reverse Disease Progression in Ndufs4 KO Mice

Figure 4A:
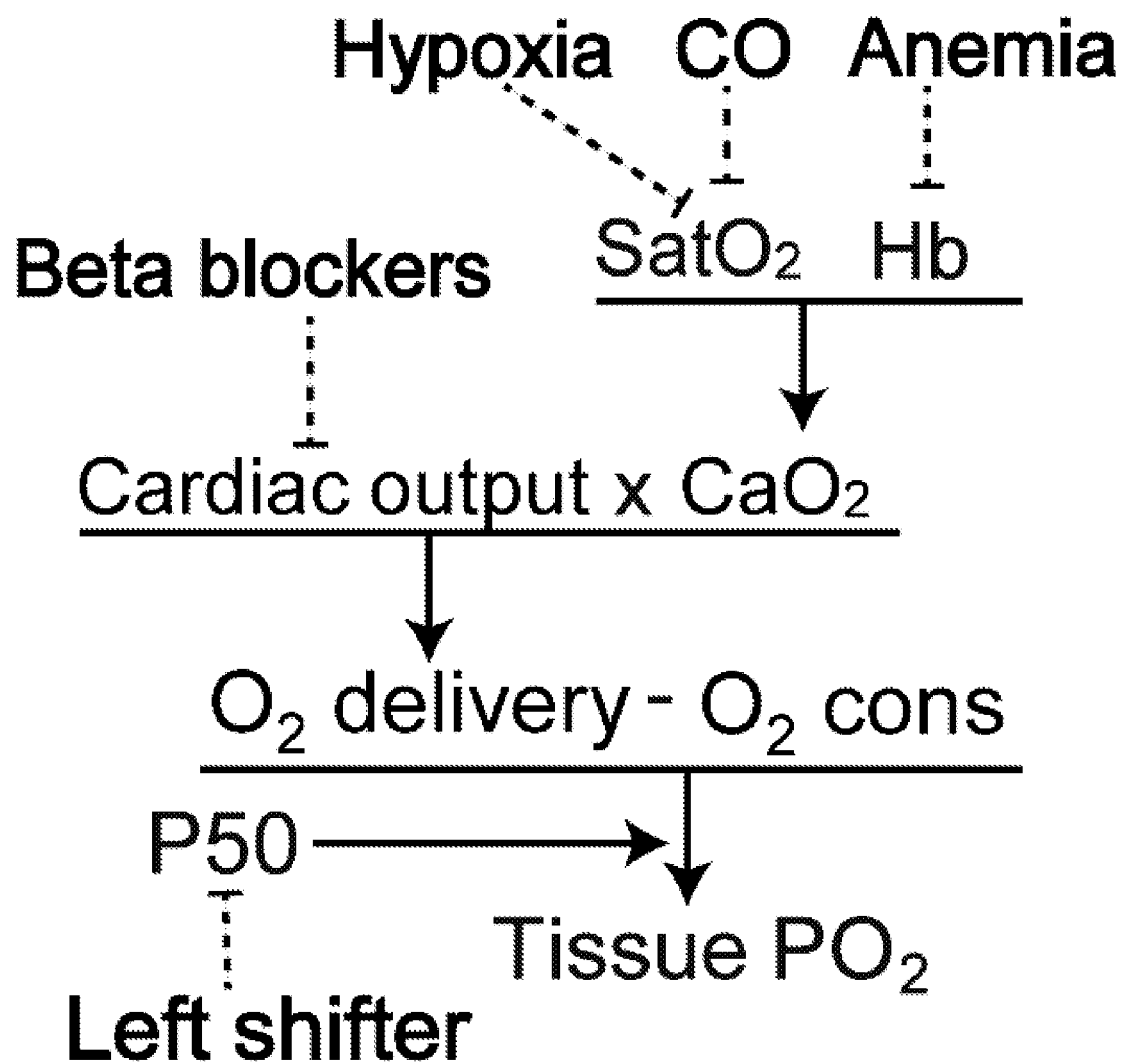
FIGS. 4A-E: Severe anemia decreases brain oxygenation and rescues neurological disease in the Ndufs4 KO mouse (A) Schematic of variables affecting tissue oxygenation. Therapeutic interventions shown are hypoxia, CO, Anemia, Beta blockers, and Left shifters; the remainder are physiological variables. (B) Gradual decrease in hemoglobin following serial phlebotomy every 2-3 days for ~20 d, in combination with an Fe-deficient diet (n=7) (C) Brain $PO_2$ (vestibular nuclei) of WT and KO mice that are untreated or made anemic using phlebotomy, in combination with an Fe-deficient diet (WT data same as FIG. 2). (D) Survival of untreated (Ferrari et al., 2017) or anemic Ndufs4 KO mice. (E) MRI of anemic Ndufs4 KO mice at 80 d or 170 d of age. Note: Mice scanned in left and right panels are distinct. Rows correspond to different mice to show reproducibility. Arrows depict lesions in vestibular nuclei.

The ability of CO treatment to rescue disease serves as a proof-of-concept that additional therapeutic regimens which affect oxygen delivery might also be protective. In theory, affecting several physiological parameters (arterial Hb saturation, Hb content, cardiac output, oxygen consumption, etc.) should also lower brain $PO_2$ and rescue disease (FIG. 4A). We explored an additional mode of decreasing oxygen delivery—extreme anemia achieved by phlebotomy in combination with dietary iron deficiency.

Figure 4B:
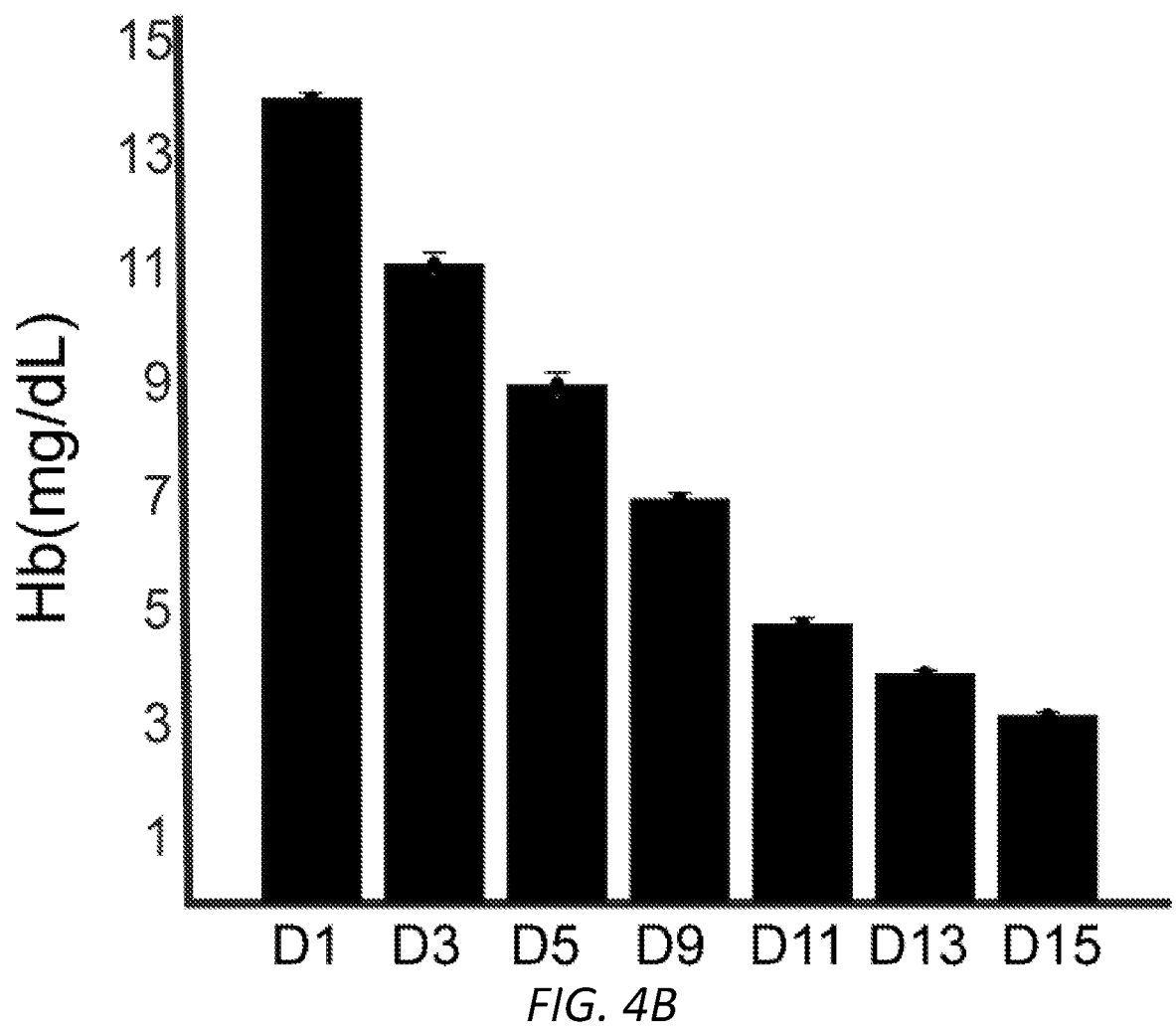
Figure 4C:
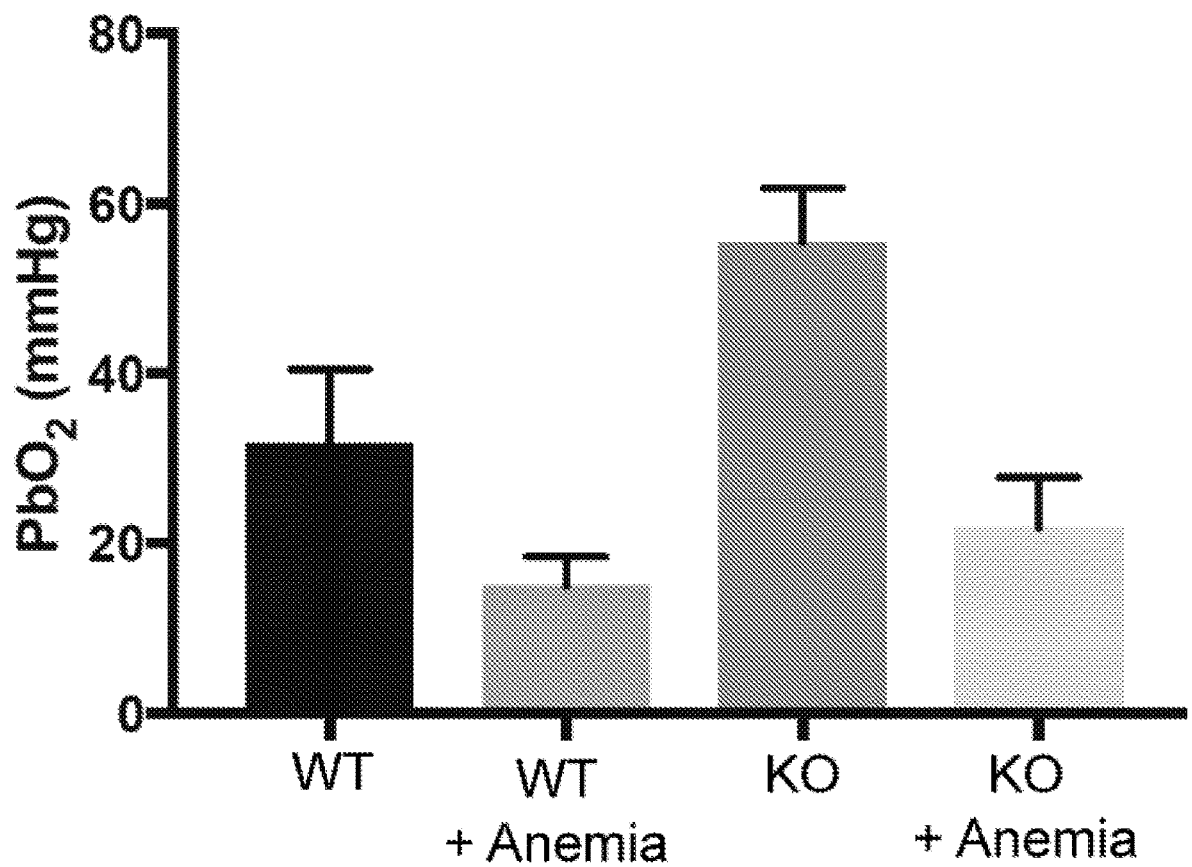
Figure 4D:
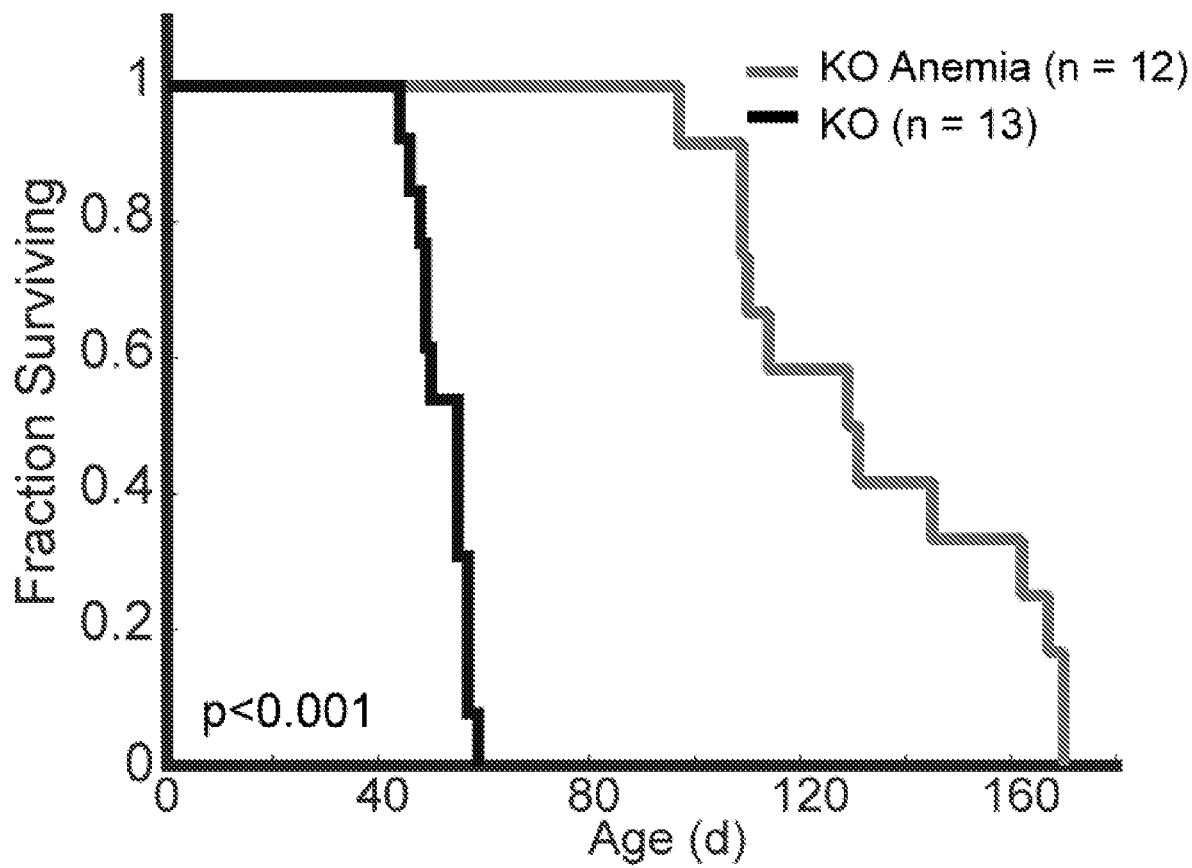
Figure 4E:
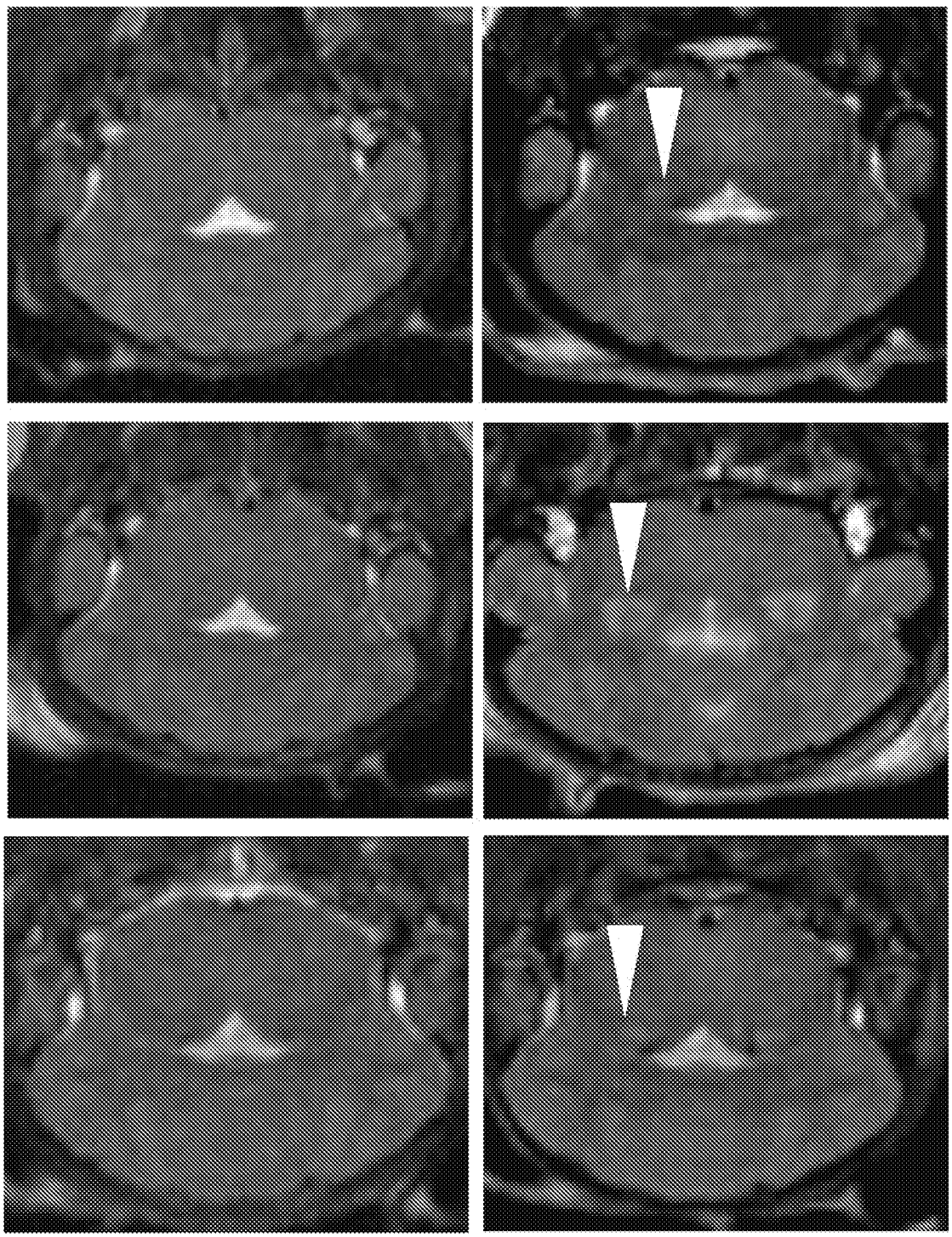

One simple strategy to decrease oxygen delivery is to limit the number of circulating red blood cells. In humans, chronic anemia causes weakness, lethargy, and reversible hair loss (Lopez et al., 2016). However, phlebotomy remains the first line therapy for a small number of diseases, including certain forms of polycythemia and hemochromatosis. We therefore phlebotomized our KO mice. Mice were bled ~200-400 microliters by tail vein, 5-6 times with 2-3 d in between bleeding sessions to allow blood volume to recover. Mice were also placed on an Fe-deficient diet to prevent the regeneration of RBCs. Using this therapeutic regimen, we were able to cause extreme anemia in KO mice, reaching an average Hb of 2-3 g/dL (FIG. 4B). While this is an extreme level of anemia, mice appeared relatively normal and active even at these low levels of Hb. To determine the effects of anemia on brain $PO_2$, we once again used the optical probe to measure cerebral oxygenation in WT and KO mice that were untreated or subjected to our therapeutic anemia protocol. Similar to CO treatment and inhaled hypoxia, anemia reduced the brain hyperoxia observed in Ndufs4 KO mice, down to WT levels (FIG. 4C). This anemia protocol extended the life of KO mice from a median of 55 d [4] to a median of ~130 d (FIG. 4D). Moreover, MRI lesions were not apparent at 50-70 d of age when they normally appeared in untreated mice. However, brain lesions did become apparent closer to death at ~150 d (FIG. 4E). The ability of this relatively simple procedure—severe anemia—to rescue disease, further establishes proof of concept that brain tissue oxygenation is a key parameter in the pathogenesis of neurological disease in Leigh syndrome.

REFERENCES

Aragonés, J., Schneider, M., Van Geyte, K., Fraisl, P., Dresselaers, T., Mazzone, M., Dirkx, R., Zacchigna, S., Lemieux, H., Jeoung, N. H. and Lambrechts, D. (2008). Deficiency or inhibition of oxygen sensor Phd1 induces hypoxia tolerance by reprogramming basal metabolism. Nature Genetics 40, 170-180.

Ast, T., Meisel, J. D., Patra, S., Wang, H., Grange, R. M., Kim, S. H., Calvo, S. E., Orefice, L. L., Nagashima, F., Ichinose, F. and Zapol, W. M. (2019). Hypoxia Rescues Frataxin Loss by Restoring Iron Sulfur Cluster Biogenesis. Cell 177, 1507-1521.

Bishop, T., Gallagher, D., Pascual, A., Lygate, C. A., de Bono, J. P., Nicholls, L. G., Ortega-Saenz, P., Oster, H., Wijeyekoon, B., Sutherland, A. I. and Grosfeld, A. (2008). Abnormal sympathoadrenal development and systemic hypotension in PHD3−/− mice. Molecular and Cellular Biology 28, 3386-3400.

Blumenthal, I. (2001). Carbon monoxide poisoning. Journal of the Royal Society of Medicine 94, 270-272.

Ferrari, M., Jain, I. H., Goldberger, O., Rezoagli, E., Thoonen, R., Cheng, K. H., Sosnovik, D. E., Scherrer-Crosbie, M., Mootha, V. K. and Zapol, W. M. (2017). Hypoxia treatment reverses neurodegenerative disease in a mouse model of Leigh syndrome. Proceedings of the National Academy of Sciences 114, E4241-E4250.

Gorman, G. S., et al. (2015). Prevalence of nuclear and mitochondrial DNA mutations related to adult mitochondrial disease. Ann. Neurol. 77, 753-759.

Hickey, M M., Lam, J. C., Bezman, N. A., Rathmell, W. K. and Simon, M. C. (2007). von Hippel-Lindau mutation in mice recapitulates Chuvash polycythemia via hypoxia-inducible factor-2a signaling and splenic erythropoiesis. The Journal of Clinical Investigation 117, 3879-3889.

Hikmat, O., Charalampos, T., Klingenberg, C., Rasmussen, M., Tallaksen, C. M., Brodtkorb, E., Fiskerstrand, T., McFarland, R., Rahman, S. and Bindoff, L. A. (2017). The presence of anaemia negatively influences survival in patients with POLG disease. J Inherit Metab Dis. 40, 861-866.

Hirst, J., King, M. S. and Pryde, K. R. (2008). The production of reactive oxygen species by complex I. Biochem Soc Trans. 36, 976-980.

Ivan, M., Kondo, K., Yang, H., Kim, W., Valiando, J., Ohh, M., Salic, A., Asara, J. M., Lane, W. S. and Kaelin Jr, W. G. (2001). HIFα targeted for VHL-mediated destruction by proline hydroxylation: implications for O2 sensing. Science 292, 464-468.

Jain, I. H., Zazzeron, L., Goli, R., Alexa, K., Schatzman-Bone, S., Dhillon, H., Goldberger, O., Peng, J., Shalem, O., Sanjana, N. E. and Zhang, F. (2016). Hypoxia as a therapy for mitochondrial disease. Science 352, 54-61.

Jeon, S. B., Sohn, C. H., Seo, D. W., Oh, B. J., Lim, K. S., Kang, D. W. and Kim, W. Y. (2018). Acute brain lesions on magnetic resonance imaging and delayed neurological sequelae in carbon monoxide poisoning. JAMA Neurology 75, 436-443.

Kayser, E. B., Sedensky, M. M. and Morgan, P. G. (2016). Region-specific defects of respiratory capacities in the Ndufs4 (KO) mouse brain. PloS One 11, p. e0148219.

Kussmaul, L. and Hirst, J. (2006). The mechanism of superoxide production by NADH: ubiquinone oxidoreductase (complex I) from bovine heart mitochondria. Proceedings of the National Academy of Sciences 103, 7607-7612.

Lake, N. J., Bird, M. J., Isohanni, P. and Paetau, A. (2015) Leigh syndrome: neuropathology and pathogenesis. J. Neuropathol. Exp. Neurol. 74, 482-492.

Li, X., Cui, X. X., Chen, Y. J., Wu, T. T., Xu, H. X., Yin, H. and Wu, Y. C. (2018). Therapeutic Potential of a prolyl hydroxylase inhibitor FG-4592 for Parkinson's Diseases in vitro and in vivo: Regulation of Redox Biology and Mitochondrial Function. Front Aging Neurosci. 10, 121.

Lopez, A., Cacoub, P., Macdougall, I. C. and Peyrin-Biroulet, L. (2016). Iron deficiency anaemia. The Lancet 387, 907-916.

Majmundar, A. J., Wong, W. J. and Simon, M. C. (2010). Hypoxia-inducible factors and the response to hypoxic stress. Molecular Cell 40, 294-309.

Martinez-Sáez, O., Borau, P. G., Alonso-Gordoa, T., Molina-Cerrillo, J. and Grande, E. (2017). Targeting HIF-2α in clear cell renal cell carcinoma: A promising therapeutic strategy. Crit Rev Oncol Hematol. 111, 117-123.

Mazzone, M., Dettori, D., de Oliveira, R. L., Loges, S., Schmidt, T., Jonckx, B., Tian, Y. M., Lanahan, A. A., Pollard, P., de Almodovar, C. R. and De Smet, F. (2009). Heterozygous deficiency of PHD2 restores tumor oxygenation and inhibits metastasis via endothelial normalization. Cell 136, 839-851.

O'Donnell, P., Buxton, P. J., Pitkin, A. and Jarvis, L. J. (2000). The magnetic resonance imaging appearances of the brain in acute carbon monoxide poisoning. Clinical Radiology 55, 273-280.

Oksenberg, D., Dufu, K., Patel, M. P., Chuang, C., Li, Z., Xu, Q., Silva-Garcia, A., Zhou, C., Hutchaleelaha, A., Patskovska, L. and Patskovsky, Y. (2016). GBT 440 increases haemoglobin oxygen affinity, reduces sickling and prolongs RBC half-life in a murine model of sickle cell disease. British Journal of Haematology 175, 141-153.

Quaegebeur, A., Segura, I., Schmieder, R., Verdegem, D., Decimo, I., Bifari, F., Dresselaers, T., Eelen, G., Ghosh, D., Davidson, S. M. and Schoors, S. (2016). Deletion or inhibition of the oxygen sensor PHD1 protects against ischemic stroke via reprogramming of neuronal metabolism. Cell Metabolism 23, 280-291.

Rich, P. (2003). Chemiosmotic coupling: the cost of living. Nature 421, 583.

Rosas, I. O., Goldberg, H. J., Collard, H. R., El-Chemaly, S., Flaherty, K., Hunninghake, G. M., Lasky, J. A., Lederer, D. J., Machado, R., Martinez, F. J. and Maurer, R. (2018). A phase ii clinical trial of low-dose inhaled carbon monoxide in idiopathic pulmonary fibrosis. Chest 153, 94-104.

Stepanova, A., Konrad, C., Manfredi, G., Springett, R., Ten, V. and Galkin, A. (2019). The dependence of brain mitochondria reactive oxygen species production on oxygen level is linear, except when inhibited by antimycin A. Journal of Neurochemistry 148, 731-745.

Taivassalo, T., Abbott, A., Wyrick, P. and Haller, R. G. (2002). Venous oxygen levels during aerobic forearm exercise: an index of impaired oxidative metabolism in mitochondrial myopathy. Annals of Neurology 51, 38-44.

Wang, G. L., Jiang, B. H., Rue, E. A. and Semenza, G. L. (1995). Hypoxia-inducible factor 1 is a basic-helix-loop-helix-PAS heterodimer regulated by cellular O2 tension. Proceedings of the National Academy of Sciences 92, 5510-5514.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for the treatment of a disorder associated with mitochondrial dysfunction in a subject in need of treatment, the method comprising administering to the subject a therapeutically effective amount of (i) a treatment that increases hemoglobin affinity for oxygen leading to left-shifting an oxygen dissociation curve of hemoglobin, wherein the hemoglobin left-shifting is a sign of hemoglobin's increased affinity for oxygen and (ii) a treatment that induces anemia, wherein the treatment that increases hemoglobin affinity for oxygen leading to left-shifting an oxygen dissociation curve of hemoglobin comprises administration of one or more substituted benzaldehydes, and the treatment that induces anemia comprises administration of a Hypoxia-Inducible Factor 2 (HIF2) alpha inhibitor selected from the group consisting of PT2399, PT2977, and PT2385.

2. The method of claim 1, wherein the disorder associated with mitochondrial dysfunction is a disease caused by a genetic mutation; a neurodegenerative disease; diabetes; or aging and age-associated decline.

3. The method of claim 1, wherein the treatment that increases hemoglobin affinity for oxygen leading to left-shifting an oxygen dissociation curve of hemoglobin comprises administration of VOXELOTOR (GBT440).

4. The method of claim 1, wherein the treatment that induces anemia comprises administration of PT2399.

5. The method of claim 1, wherein the disorder associated with mitochondrial dysfunction is Leigh syndrome.

6. The method of claim 1, wherein the disorder associated with mitochondrial dysfunction is Complex I deficiency.

* * * * *